(12) United States Patent
Togino

(10) Patent No.: US 12,055,696 B2
(45) Date of Patent: Aug. 6, 2024

(54) SET OF NEGATIVE MENISCUS LENSES, WIDE-ANGLE OPTICAL SYSTEM, IMAGE PICKUP APPARATUS, AND PROJECTION APPARATUS

(71) Applicant: OLYMPUS CORPORATION, Hachioji (JP)

(72) Inventor: Takayoshi Togino, Koganei (JP)

(73) Assignee: OLYMPUS CORPORATION, Tokyo (JP)

( * ) Notice: Subject to any disclaimer, the term of this patent is extended or adjusted under 35 U.S.C. 154(b) by 656 days.

(21) Appl. No.: 17/329,303

(22) Filed: May 25, 2021

(65) Prior Publication Data
US 2021/0278640 A1 Sep. 9, 2021

Related U.S. Application Data

(63) Continuation of application No. PCT/JP2018/043785, filed on Nov. 28, 2018.

(51) Int. Cl.
G02B 13/06 (2006.01)
G02B 9/60 (2006.01)
G02B 9/62 (2006.01)
G02B 9/64 (2006.01)

(52) U.S. Cl.
CPC .............. G02B 13/06 (2013.01); G02B 9/60 (2013.01); G02B 9/62 (2013.01); G02B 9/64 (2013.01)

(58) Field of Classification Search
CPC ........ G02B 13/06; G02B 13/04; G02B 13/16; G02B 17/088; G02B 23/243
See application file for complete search history.

(56) References Cited

U.S. PATENT DOCUMENTS

| | | | |
|---|---|---|---|
| 2,947,219 A | 8/1960 | Heel et al. |
| 3,524,697 A | 8/1970 | Isshiki et al. |
| 5,502,592 A | 3/1996 | Jamieson |
| 8,526,112 B2 | 9/2013 | Baba |
| 8,678,598 B2 | 3/2014 | Harris |
| 9,411,078 B2 | 8/2016 | Harris |
| 9,690,081 B2 | 6/2017 | Harris |
| 9,696,526 B2 | 7/2017 | Inoue |
| 9,918,051 B2 | 3/2018 | Harris |
| 10,274,717 B2 | 4/2019 | Togino |
| 10,653,298 B2 | 5/2020 | Togino |

(Continued)

FOREIGN PATENT DOCUMENTS

CN 106932888 A * 7/2017 ............. G02B 13/06
GB 870519 A 6/1961
(Continued)

OTHER PUBLICATIONS

Machine translation of CN106932888 (Year: 2017).*

(Continued)

*Primary Examiner* — Alicia M Harrington
(74) *Attorney, Agent, or Firm* — Holtz, Holtz & Volek PC

(57) ABSTRACT

A set of negative meniscus lenses is a set which is to be used for an optical system having an angle of view not smaller than 240°. One negative meniscus lens in the set of negative meniscus lenses is located nearest to an object. The set of negative meniscus lenses has a predetermined lens surface, and the predetermined lens surface is a hemispherical surface or a surface extending beyond hemisphere.

7 Claims, 24 Drawing Sheets

(56) References Cited

U.S. PATENT DOCUMENTS

| 10,674,121 | B2 | 6/2020 | Harris |
|---|---|---|---|
| 2010/0014174 | A1 | 1/2010 | Togino |
| 2012/0022327 | A1 | 1/2012 | Baba |
| 2017/0023779 | A1 | 1/2017 | Inoue |

FOREIGN PATENT DOCUMENTS

| JP | 2008151904 A | 7/2008 |
|---|---|---|
| JP | 2009128654 A | 6/2009 |
| JP | 2010220844 A | 10/2010 |
| JP | 2017026802 A | 2/2017 |

OTHER PUBLICATIONS

International Search Report (ISR) (and English language translation thereof) dated Mar. 5, 2019, issued in International Application No. PCT/JP2018/043785.
Written Opinion dated Mar. 5, 2019, issued in International Application No. PCT/JP2018/043785.
International Preliminary Report on Patentability (IPRP) (and English language translation thereof) dated May 25, 2021 issued in International Application No. PCT/JP2018/043785.
U.S. Appl. No. 17/189,586, First Named Inventor: Takayoshi Togino; Title: "Optical System and Optical Apparatus Including the Same"; filed Mar. 2, 2021.

* cited by examiner

Y DIRECTION  X DIRECTION (130.00°)

(110.00°)

(90.00°)

(45.00°)

(0.00°)

```
--------------- 656.2725
─────────────── 587.5618
··············· 546.0740
─ · ─ · ─ · ─ · 486.1327
─ ─ ─ ─ ─ ─ ─ ─ 435.8343
```

Y DIRECTION　　　X DIRECTION
FIG.20A　　　FIG.20F
(150.00°)
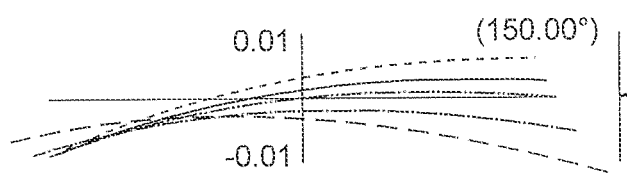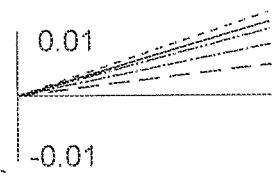
FIG.20B　　　FIG.20G
(132.00°)
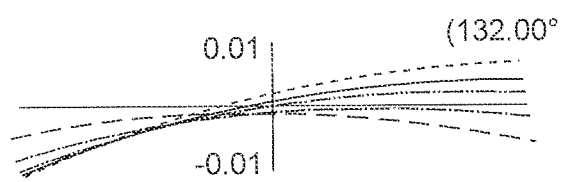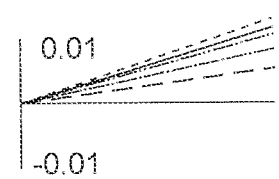
FIG.20C　　　FIG.20H
(90.00°)
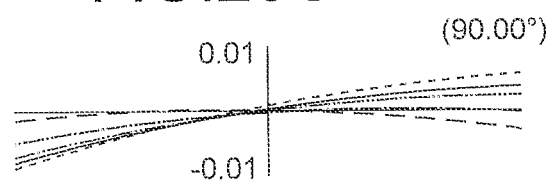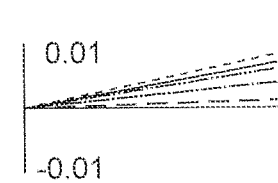
FIG.20D　　　FIG.20I
(27.00°)
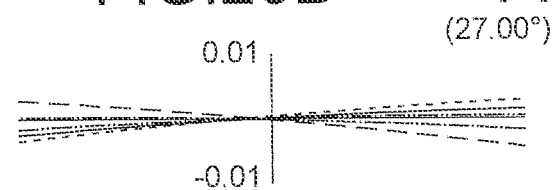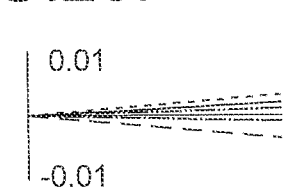
FIG.20E　　　FIG.20J
(0.00°)
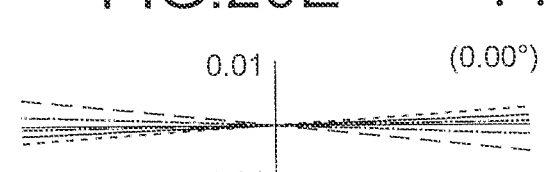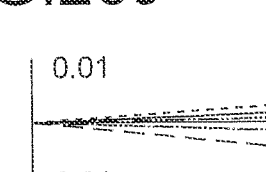

SET OF NEGATIVE MENISCUS LENSES, WIDE-ANGLE OPTICAL SYSTEM, IMAGE PICKUP APPARATUS, AND PROJECTION APPARATUS

CROSS-REFERENCE TO RELATED APPLICATION

The present application is a continuation application of International Application No. PCT/JP2018/043785 filed on Nov. 28, 2018, the entire contents of which are incorporated herein by reference.

BACKGROUND

Technical Field

The present disclosure relates to a set of negative meniscus lenses, a wide-angle optical system, an image pickup apparatus, and a projection apparatus.

Description of the Related Art

Optical systems having a half angle of view not smaller than 90° have been disclosed in Japanese Patent Application Laid-open Publication No. 2008-151904, US Patent Publication No. 2947219, and US Patent Publication No. 9411078.

In Japanese Patent Application Laid-open Publication No. 2008-151904, a wide-angle optical system having a half angle of view of 120° has been disclosed. In this wide-angle optical system, one negative meniscus lens or two negative meniscus lenses are disposed on an object side. In the negative meniscus lens, an extended rotation free-form surface is used.

In US Patent Publication No. 2947219, a wide-angle optical system having a half angle of view of 135° has been disclosed. In this wide-angle optical system, two negative meniscus lenses are disposed on an object side. In the two negative meniscus lenses, each object-side surface has a shape close to a hemispherical shape.

In US Patent Publication No. 9411078, a wide-angle optical system having a half angle of view of 120° has been disclosed. In this wide-angle optical system, one negative meniscus lens is disposed on an object side.

SUMMARY

A set of negative meniscus lenses according to at least some embodiments of the present disclosure is a set of negative meniscus lenses which is used for an optical system having an angle of view not smaller than 240°, and includes:
a predetermined lens surface, wherein
one negative meniscus lens in the set of negative meniscus lenses is located nearest to an object, and
the predetermined lens surface is a hemispherical surface or a surface extending beyond hemisphere.

Moreover, a wide-angle optical system according to at least some embodiments of the present disclosure is a wide-angle optical system having an angle of view not smaller than 240°, and includes:
the abovementioned set of negative meniscus lenses, and
a lens which is disposed on an image side of the set of negative meniscus lenses.

Furthermore, an image pickup apparatus according to at least some embodiments of the present disclosure includes:
the abovementioned wide-angle optical system, and
an image sensor which is disposed on an image side of the wide-angle optical system, wherein
the image sensor has an image pickup surface, and converts an image formed on the image pickup surface by the wide-angle optical system to an electric image.

A projection apparatus according to at least some embodiments of the present disclosure includes:
the abovementioned wide-angle optical system, and
a display element which is disposed on an image side of the wide-angle optical system, wherein
the display element has a display surface, and
an image displayed on the display surface is projected on an object side by the wide-angle optical system.

BRIEF DESCRIPTION OF THE DRAWINGS

FIG. 20A, FIG. 20B, FIG. 20C, FIG. 20D, FIG. 20E, FIG. 20F, FIG. 20G, FIG. 20H, FIG. 20I, and FIG. 20J are aberration diagrams of the optical system of the example 2;

DETAILED DESCRIPTION

Prior to the explanation of examples, action and effect of embodiments according to certain aspects of the present disclosure will be described below. In the explanation of the action and effect of the embodiments concretely, the explanation will be made by citing concrete examples. However, similar to a case of the examples to be described later, aspects exemplified thereof are only some of the aspects included in the present disclosure, and there exists a large number of variations in these aspects. Consequently, the present disclosure is not restricted to the aspects that will be exemplified.

A set of negative meniscus lenses of the present embodiment is a set of negative meniscus lenses which is used for an optical system having an angle of view not smaller than 240°. One negative meniscus lens in the set of negative meniscus lenses is located nearest to an object. The set of negative meniscus lenses has a predetermined lens surface, and the predetermined lens surface is a hemispherical surface or a surface extending beyond hemisphere.

In an optical system having a narrow angle of view, a thickness of a lens located nearest to the object is thin. Moreover, for a light ray which is incident on a surface of this lens, a widening of an angle of the light ray is small. In this case, it is easily possible to make a light ray emerge from the lens. Therefore, regarding a method for making a light ray emerge from the lens, there is no need to pay heed in particular.

Whereas, in an optical system having a wide angle of view, a thickness of a lens located nearest to the object is thick. Moreover, for a light ray which is incident on a surface of this lens, a widening of an angle of the light ray is large. Therefore, a method for making a light ray emerge from the lens becomes particularly significant.

Figure 1A:
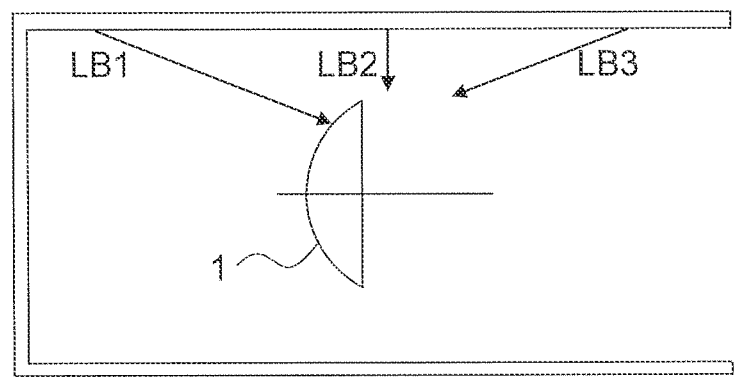
FIG. 1A, FIG. 1B, and FIG. 1C are diagrams showing lens surfaces.
Figure 1B:
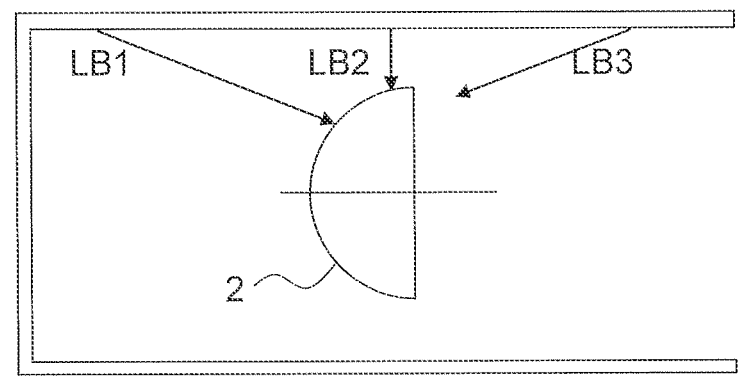
Figure 1C:
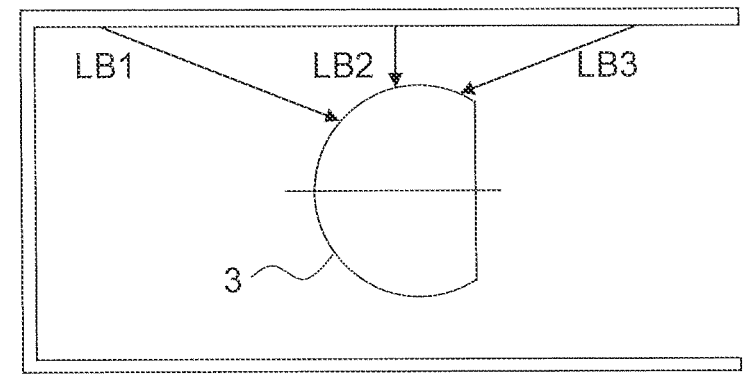

FIG. 1A, FIG. 1B, and FIG. 1C are diagrams showing lens surfaces. FIG. 1A shows a surface not extending beyond hemisphere, FIG. 1B shows a hemispherical surface, and FIG. 1C shows a surface extending beyond hemisphere.

A lens is located at an interior of a circular cylinder having a bottom surface. A convex surface of the lens is directed toward the bottom surface. The interior of the circular cylinder is illuminated by illumination light (not shown in the diagram). Light is incident on the lens from the bottom surface and a side surface.

A light ray LB1 indicates light from an area located on a front side of the lens surface. By the light ray LB1 being incident on the lens surface, front-viewing is possible. A light ray LB2 indicates light from an area located lateral to the lens surface. By the light ray LB2 being incident on the lens surface, side-viewing is possible. A light ray LB3 indicates light from an area located on a rear side of the lens surface. By the light ray LB3 being incident on the lens surface, rear-viewing is possible.

A lens surface 1 is an example of a surface not extending beyond hemisphere. At the lens surface 1, the light ray LB1 is incident on the lens surface 1, but the light ray LB2 and the light ray LB3 are not incident on the lens surface 1. Consequently, in a case in which the lens surface 1 is used, the front-viewing is possible, but the side-viewing and the rear-viewing are not possible.

A lens surface 2 is an example of a hemispherical surface. At the lens surface 2, the light ray LB1 and the light ray LB2 are incident on the lens surface 2, but the light ray LB3 is not incident on the lens surface 2. Consequently, in a case in which the lens surface 2 is used, the front-viewing and the side-viewing are possible, but the rear-viewing is not possible.

A lens surface 3 is a surface extending beyond hemisphere. At the lens surface 3, the light ray LB1, the light ray LB2, and the light ray LB3 are incident on the lens surface 3. Consequently, in a case in which the lens surface 3 is used, the front-viewing, the side-viewing, and the rear-viewing are possible.

Light rays emerge in various directions from a point of emergence of the light ray LB1. Similar is true for a point of emergence of the light ray LB2 and a point of emergence of the light ray LB3. Consequently, for instance, at the lens surface 1, a part of the light ray LB2 is incident on the lens surface 1.

However, at the lens surface 1, light rays incident on the lens surface 1 from the point of emergence of the light ray LB2 are extremely few in comparison to the lens surface 2 and the lens surface 3. Consequently, even when it is possible to carry out the side viewing, achieving an optical image of an appropriate brightness for observation is practically difficult. In such manner, in a case in which the lens surface 1 is used, the side viewing is not possible.

An area of a surface on which a light ray is incident becomes wider in order of the surface not extending beyond hemisphere, the hemispherical surface, and the surface extending beyond hemisphere. The area of the surface on which a light ray is incident indicates a field of view or an angle of view. The field of view or the angle of view becomes wider in order of the surface not extending beyond hemisphere, the hemispherical surface, and the surface extending beyond hemisphere. Therefore, even for the surface not extending beyond hemisphere, the side-viewing becomes possible as the area of the surface on which the light ray is incident becomes closer to an area of the hemispherical surface.

Moreover, the area of the surface on which the light ray is incident indicates the number of light rays passing through the surface. The number of light rays passing through the surface becomes larger in order of the surface not extending beyond hemisphere, the hemispherical surface, and the surface extending beyond hemisphere. Accordingly, the brightness of optical image increases in order of the surface not extending beyond hemisphere, the hemispherical surface, and the surface extending beyond hemisphere.

In a case in which, a spherical surface is used for the lens surface, the lens surface is indicated by a circular arc in a lens cross section. It is possible to indicate a range of the lens surface by a length of the circular arc. It is possible to indicate the length of the circular arc by an angle formed by two ends of the circular arc and a center of the circle (hereinafter, referred to as 'angle of the circular arc').

In the lens surface 1, the angle of the circular arc is smaller than 180°. In the lens surface 2, the angle of the circular arc is 180°. In the lens surface 3, the angle of the circular arc is larger than 180°.

A surface for which the angle of circular arc is not smaller than 170° and is not larger than 180° is set to be a hemispherical surface. Moreover, a surface for which the angle of circular arc is larger than 180° is set to be a surface extending beyond hemisphere.

In the set of negative meniscus lenses of the present embodiment, a spherical surface is used for the lens surface.

The set of negative meniscus lenses of the present embodiment has the predetermined lens surface. The predetermined lens surface is either a hemispherical surface or a surface extending beyond hemisphere.

As mentioned above, with the hemispherical surface or the surface extending beyond hemisphere, the side-viewing and the rear-viewing are possible in addition to the front-viewing. Therefore, by using the set of negative meniscus lenses of the present embodiment, it is possible to realize a wide-angle optical system, for example, an image forming optical system having an angle of view not smaller than 2400 or a projection optical system having an angle of view not smaller than 240°.

It is preferable that the set of negative meniscus lenses of the present embodiment include a first meniscus lens and a second meniscus lens, and the first meniscus lens and the second meniscus lens be adjacent.

By making such arrangement, it is possible to realize a wide-angle optical system, for example, an image forming optical system having an angle of view not smaller than 240°, or a projection optical system having an angle of view not smaller than 240°.

In the set of negative meniscus lenses of the present embodiment, it is preferable that following conditional expressions (1) and (2) be satisfied:

$$0.9 < (RL1o/ndL1)/dL1oi < 1.6 \quad (1)$$

$$0.4 < (RL2o/ndL2)/dL2oi < 1.4 \quad (2)$$

where,

RL1o denotes a radius of curvature of an object-side surface of the first meniscus lens, RL2o denotes a radius of curvature of an object-side surface of the second meniscus lens, ndL1 denotes a refractive index for a d-line of the first meniscus lens, ndL2 denotes a refractive index for a d-line of the second meniscus lens, dL1oi denotes a distance between a center of curvature of the object-side surface of the first meniscus lens and a center of curvature of an image-side surface of the first meniscus lens, and dL2oi denotes a distance between a center of curvature of the object-side surface of the second meniscus lens and a center of curvature of an image-side surface of the second meniscus lens.

The set of negative meniscus lenses of the present embodiment includes the first meniscus lens and the second meniscus lens. A spherical surface is used for a lens surface of the first meniscus lens and a lens surface of the second meniscus lens. Accordingly, the set of negative meniscus lenses of the present embodiment has four spherical surfaces. The four spherical surfaces will be described below.

Figure 2:
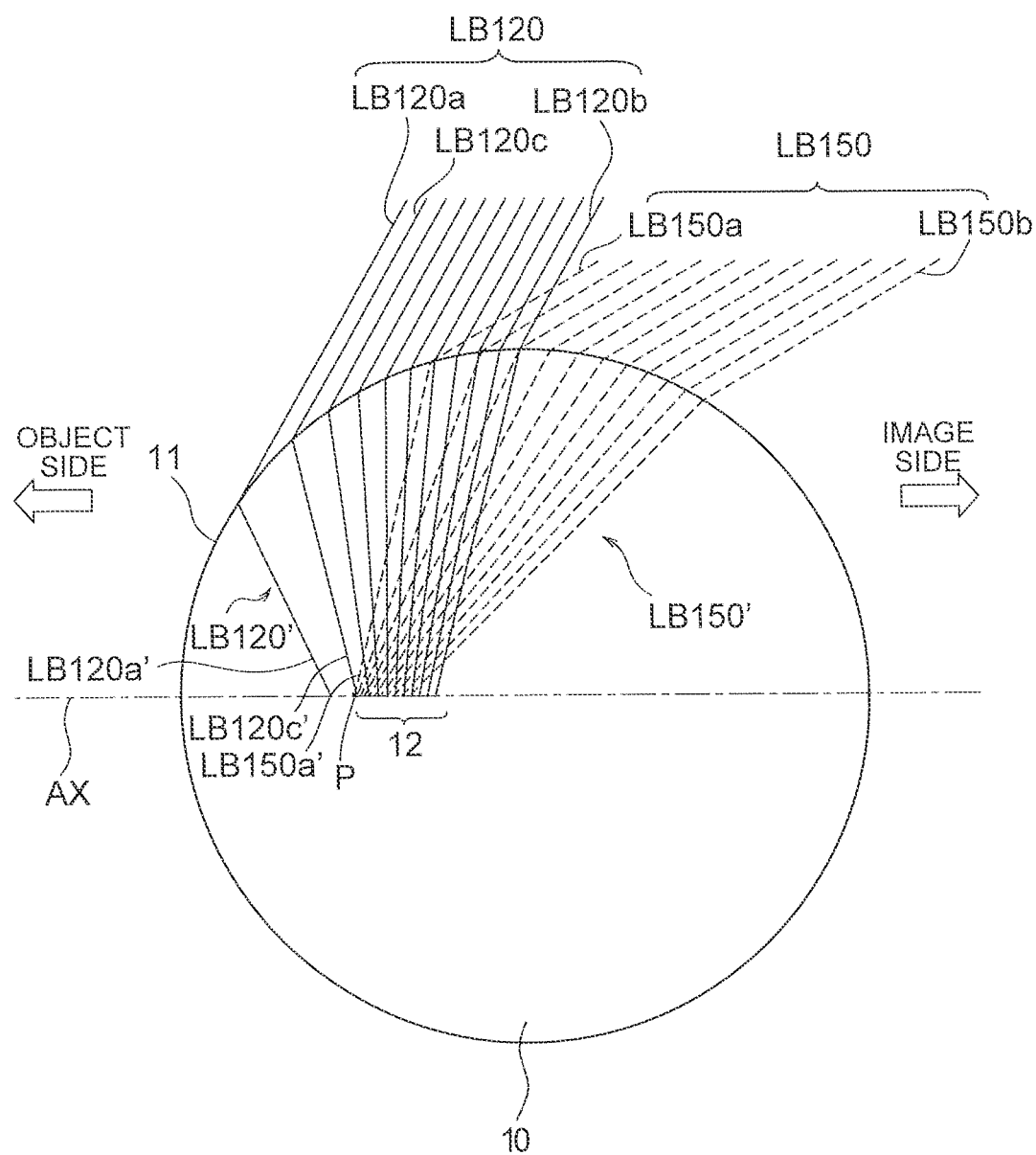
FIG. 2 is a diagram showing light rays incident on a spherical lens.

FIG. 2 is a diagram showing light rays incident on a spherical lens. In FIG. 2, a light-ray group having a half angle of view of 120° is indicated by solid lines. A light-ray group having a half angle of view of 1500 is indicated by broken lines.

A spherical lens 10 has a lens surface 11. The lens surface 11 is a surface extending beyond hemisphere. For the spherical lens 10, it is possible to make the light-ray group with a half angle of view of 120° (hereinafter, referred to as 'light-ray group LB120') and the light-ray group with a half angle of view of 150° (hereinafter, referred to as 'light-ray group LB150') incident on an interior of the spherical lens 10.

For instance, the light-ray group 120 is light from an area located on a lateral side of the lens surface 11. The light-ray group LB150 is light from an area located on a rear side of the lens surface 11. For carrying out the side-viewing and the rear-viewing, it is necessary not only to make the light-ray group 120 and the light-ray group 150 incident on the interior of the spherical lens 10 but also to direct a light-beam group incident on the interior of the spherical lens 10 toward an image plane.

The light-ray group LB150 is incident on the spherical lens 10 from an image side. Therefore, it is preferable that the light-ray group LB150 be refracted at the lens surface 11 toward an image side as much as possible.

For improving a refraction effect at the lens surface 11, a glass material having a high refractive index is to be used for a glass material of the spherical lens 10. A glass material having a refractive index 2.0 is used for the spherical lens 10.

In the light-ray group LB120, a position of incidence of a light ray LB120a differs from a position of incidence of a light ray LB120b. Consequently, an angle of incidence of the light ray LB120a differs from an angle of incidence of the light ray LB120b. The angle of incidence of the light ray LB120a is larger than the angle of incidence of the light ray LB120b.

In the light-ray group LB150, a position of incidence of a light ray LB150a differs from a position of incidence of a light ray LB150b. Consequently, an angle of incidence of the light ray LB150a differs from an angle of incidence of the light ray LB150b. The angle of incidence of the light ray LB150a is larger than the angle of incidence of the light ray LB150b.

As the number of light rays reaching the image plane becomes larger, a brightness of an optical image increases. The maximum angle of incidence at which a light ray can be refracted at a spherical surface is 90°. Accordingly, light rays with the angle of incidence from 0° up to 90° may be made to be incident at an interior of the spherical lens 10.

However, it is difficult to make the light ray with the angle of incidence 90° incident on the interior of the spherical lens 10, actually. Accordingly, it is preferable to be able to make a light ray with an angle of incidence close to 90° incident on the interior of the spherical lens 10. The light ray with an angle of incidence close to 90° is a light ray which almost tangential to a tangential plane at a position of incidence (hereinafter, referred to as 'tangential plane').

The angle of incidence of the light ray LB120a and the angle of incidence of the light ray LB150a are close to 90°. Accordingly, it is preferable to make the light ray LB120a and the light ray 150a incident on the interior of the spherical lens 10.

Each of the light-ray group LB120 and the light-ray group LB150 is refracted at the lens surface 11. Each of a light-ray group LB120' and a light-ray group LB150' is a light-ray group after being refracted at the lens surface 11. The light-ray group LB120' and the light-ray group LB150' travel to be closer to a center of the spherical lens 10.

For making the light-ray group LB120' and the light-ray group LB150' reach the image plane, a refractive surface is to be provided at the interior of the spherical lens 10. For making the light-ray group LB120' and the light-ray group LB150' refract appropriately at the refractive surface, disposing the refractive surface appropriately becomes significant. Moreover, for setting the refractive surface, it is necessary to select a light ray appropriately.

At a position of an optical axis AX, a light ray LB120a' has reached a position somewhat distant from an area 12. Light rays except the light ray LB120a' have reached the area 12.

The light ray LB120a' is a light ray when the light ray LB120a is refracted at the lens surface 11. The angle of incidence of the light ray LB120a is the largest in the light-ray group LB120. Moreover, a light ray LB150a' is a light ray when the light ray LB150a is refracted at the lens surface 11. The angle of incidence of the light ray LB150a is the largest in the light-ray group LB150.

Accordingly, it is possible to set the refractive surface on the basis of the light ray LB120a' and the light ray LB150a'. However, at the position of the optical axis AX, a position of the light ray LB120a' is distant from the light ray LB150a'.

A light ray LB120c' is a light ray when the light ray LB120c is refracted at the lens surface 11. An angle of incidence of the light ray LB120c is slightly smaller than the angle of incidence of the light ray LB120a. However, the angle of incidence of the light ray LB120c, similarly as the angle of incidence of the light ray LB120a, is close to 90°.

Furthermore, the light ray LB120c' and the light ray LB150a' have reached near a point P. Therefore, the refractive surface may be set on the basis of the light ray LB120c' and the light ray LB150a'.

In a case of providing the refractive surface at the interior of the spherical lens 10, it is possible to make a center of curvature of the refractive surface coincide with the point P. In this case, at the refractive surface, each of the light ray LB120c' and the light ray LB150a' is incident perpendicularly with respect to the tangential plane. In other words, even in a case in which a light ray with the angle of incidence close to 90° is incident on the lens surface 11, at the refractive surface, the light ray is incident perpendicularly with respect to the tangential plane. Therefore, it is possible to make a light ray with the angle of incidence close to 90° emerge from the refractive surface.

By providing the refractive surface at the interior of the spherical lens 10, a lens is formed. By making the refractive surface a convex surface toward the object side, a meniscus lens is formed.

Figure 3:
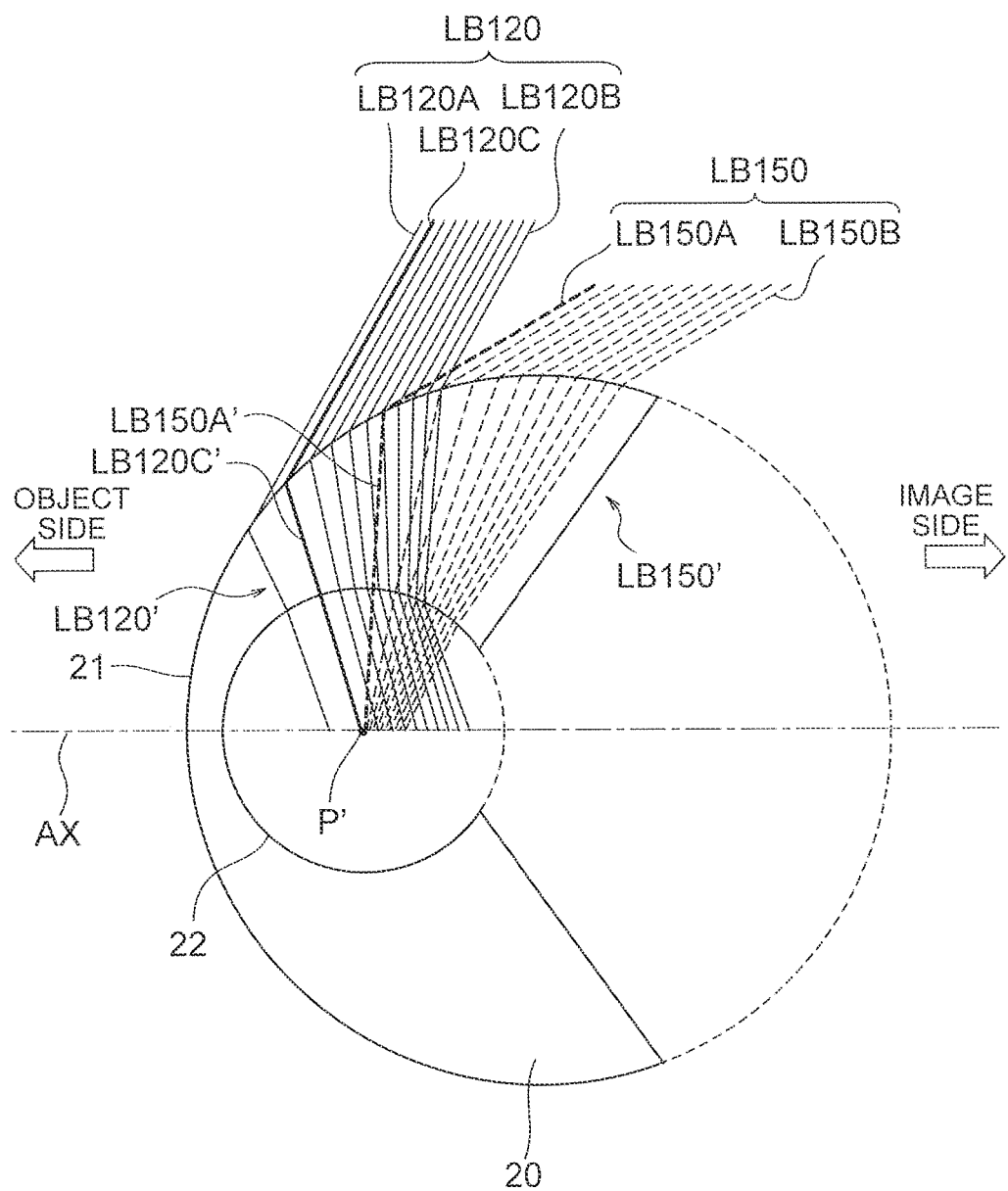
FIG. 3 is a diagram showing light rays incident on a meniscus lens.

FIG. 3 is a diagram showing light rays incident on a meniscus lens. In FIG. 3, a light-ray group having a half angle of view of 120° is indicated by solid lines, and a light-ray group having a half angle of view of 1500 is indicated by broken lines. Positions of light rays incident on a meniscus lens 20 differ from positions of light rays incident on the spherical lens 10.

The meniscus lens 20 has an object-side surface 21 and an image-side surface 22. The object-side surface 21 is a surface same as the lens surface 11. The image-side surface 22 corresponds to the refractive surface provided at the interior of the spherical lens 10.

At the object-side surface 21 and the image-side surface 22, a convex surface is directed toward the object side. A radius of curvature of the object-side surface 21 is larger than a radius of curvature of the image-side surface 22. Accordingly, the meniscus lens 20 is a negative meniscus lens having a convex surface directed toward the object side.

The object-side surface 21 and the image-side surface 22 are surfaces extending beyond hemisphere. As mentioned above, the predetermined lens surface is either a hemispherical surface or a surface extending beyond hemisphere. The object-side surface 21 and the image-side surface 22 are the predetermined lens surfaces. The meniscus lens 20 has the predetermined lens surface.

A light-ray group LB120 and a light-ray group LB150 reach the object-side surface 21. The light-ray group LB120 and the light-ray group LB150, after being refracted at the object-side surface, are incident on the interior of the meniscus lens 20.

Each of a light-ray group LB120' and a light-ray group LB150' is a light-ray group after being refracted at the object-side surface 21. The light-ray group LB120' and the light-ray group LB150' reach the image-side surface 22.

A light ray LB120C' is a light ray when a light ray LB120C is refracted at the object-side surface 21. A light ray LB150A' is a light ray when a light ray LB150A is refracted at the object-side surface 21. The light ray LB120C' and the light ray LB150A' have reached near a point P'.

The point P' corresponds to the point P in FIG. 2. In the meniscus lens 20, the image-side surface 22 is set on the basis of the light ray LB120C' and the light ray LB150A'. In other words, in the meniscus lens 20, a center of curvature of the image side surface 22 coincides with the point P.

Therefore, at the image-side surface 22, each of the light ray LB120C' and the light ray LB150A' is incident perpendicularly with respect to the tangential plane. In other words, even in a case in which a light ray with an angle of incidence close to 90° is incident on the object-side surface 21, at the image-side surface 22, the light ray is incident perpendicularly with respect to the tangential plane.

As a result, the light ray LB120C' and the light ray LB150A' emerge from the image-side surface 22. Thus, at the meniscus lens 20, it is possible to make a light ray with the angle of incidence close to 90° emerge from the image-side surface 22.

Moreover, light rays other than the light ray LB120C' and the light ray LB150A', after being refracted at the image-side surface 22, emerge from the image-side surface 22.

In the meniscus lens 20, it is possible to make incident a light-ray group with a half angle of view larger than 150°, for example, a light-ray group with a half angle of view of 170°.

Figure 4:
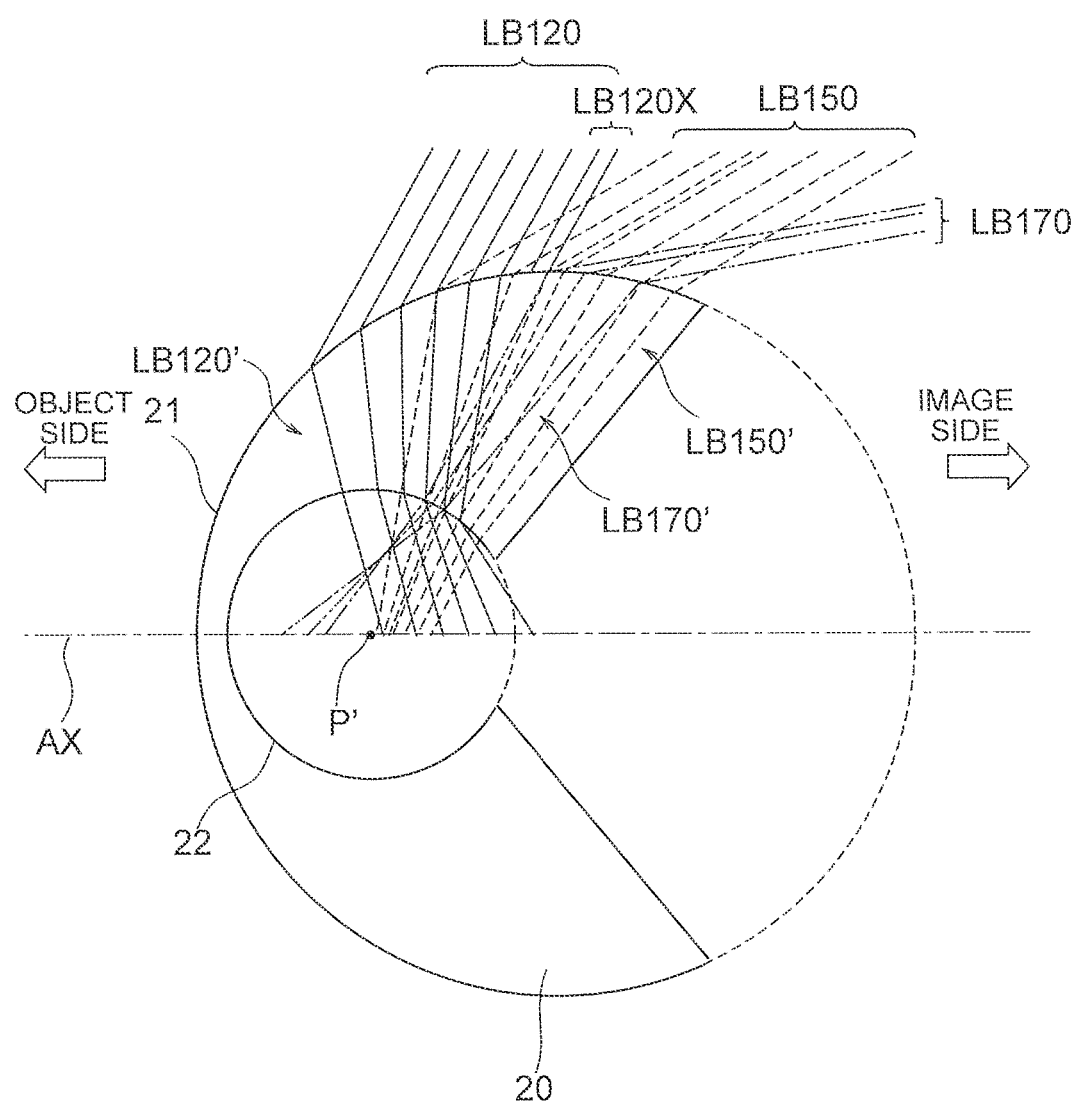
FIG. 4 is a diagram showing light rays incident on a meniscus lens.

FIG. 4 is a diagram showing light rays incident on a meniscus lens. Same reference numerals are assigned to components that are same as in FIG. 3, and description thereof is omitted. In FIG. 4, a light-ray group with a half angle of view of 170° is indicated by alternate long and two short dashes lines.

Positions of light rays incident on the meniscus lens 20 differ from positions of light rays incident on the spherical lens 10 and positions of light rays incident on the meniscus lens 20 in FIG. 3.

A light-ray group LB120, a light-ray group LB150, and a light-ray group with a half angle of view of 1700 (hereinafter, referred to as 'light-ray group LB170') reach the object-side surface 21. The light-ray group LB120, the light-ray group LB150, and the light-ray group LB170 are refracted at the object-side surface 21, and are incident on the interior of the meniscus lens 20.

Each of a light-ray groups LB120', a light-ray group LB150', and a light-ray group LB170' is a light-ray group after being refracted at the object-side surface 21. A part of the light-ray group LB120', the light-ray group LB150', and the light-ray group LB170' reach the image-side surface 22. A part of the light-ray group LB120', the light-ray group LB150', and the light-ray group LB170', after being refracted at the image-side surface 22, emerge from the image-side surface 22.

With respect to a light-ray group LB120X, light ray which travels from the object-side surface 21 up to the image-side surface 22 is not depicted. This is because, at the image-side surface 22, the light-ray group LB120X is reflected by total reflection.

FIG. 4 indicates that with respect to a light-ray group with a small half angle of view, some light rays of the light-ray group incident on the object-side surface 21 do not emerge from the meniscus lens 20.

As just described, in the meniscus lens 20, at the image-side surface, some light rays of a light-ray group with a narrow angle of view are reflected by total reflection. Therefore, in the light-ray group with a narrow angle of view, only some light rays of the light-ray group incident on the object-side surface cease to emerge from the meniscus lens. As a result, an optical image formed by the light-ray group with a narrow angle of view becomes dark.

Light rays that can emerge from the meniscus lens differ according to a position of an image-side surface and a radius of curvature of the image-side surface. A case in which the position of the image-side surface is changed, will be described by using FIG. 5 and FIG. 6.

Figure 5:
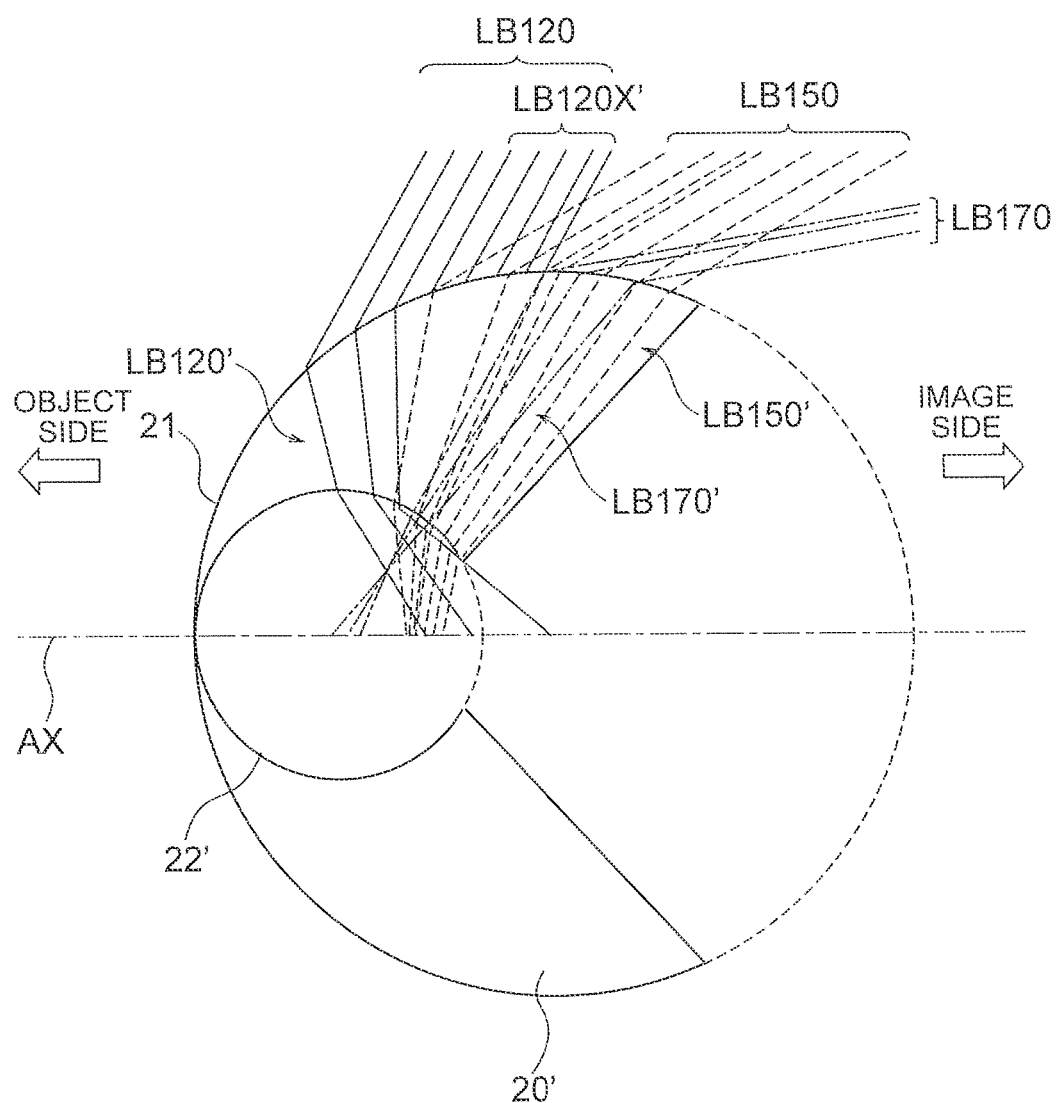
FIG. 5 is a diagram showing a case in which an image-side surface is shifted toward an object side.

FIG. 5 is a diagram showing a case in which the image-side surface is shifted toward the object side. Same reference numerals are assigned to components that are same as in FIG. 4, and description thereof is omitted. Positions of light rays incident on a meniscus lens 20' are same as the positions of light rays incident on the meniscus lens 20 shown in FIG. 4.

The meniscus lens 20' has the object-side surface 21 and an image-side surface 22'. A radius of curvature of the image-side surface 22' is same as the radius of curvature of the image-side surface 22. The image-side surface 22' is shifted toward the object side along the optical axis AX by only 1 mm from a position of the image-side surface 22.

With respect to a light-ray group 120X', light ray which travels from the object-side surface 21 up to the image-side surface 22' is not depicted. This is because, at the image-side surface 22', the light-ray group LB120X' is reflected by total reflection. Moreover, the number of light rays in the light-ray group LB120X' is larger than the number of light rays in the light-ray group LB120X.

FIG. 5 indicates that with respect to a light-ray group with a small half angle of view, some light rays of the light-ray group incident on the object-side surface 21 do not emerge from the meniscus lens 20', and the light rays not emerging from the meniscus lens 20' increase.

As just described, even in a case in which the position of the image-side surface has shifted toward the object side, at the image side surface, some light rays of the light-ray group with a narrow angle of view are reflected by total reflection. Furthermore, the number of light rays reflected by total reflection becomes large. Consequently, an optical image formed by the light-ray group with a narrow angle of view becomes even darker.

In FIG. 5, a thickness of the meniscus lens 20' is almost zero. This is due to the image-side surface being shifted by 1 mm for emphasizing the light rays. Practically, the thickness of the lens does not become zero.

However, in a meniscus lens, when a position of an image-side surface is shifted to an object side, a thickness of the meniscus lens becomes thin. Consequently, fabrication of the meniscus lens becomes difficult. Moreover, it is not possible to secure adequately a strength of the meniscus lens.

Figure 6:
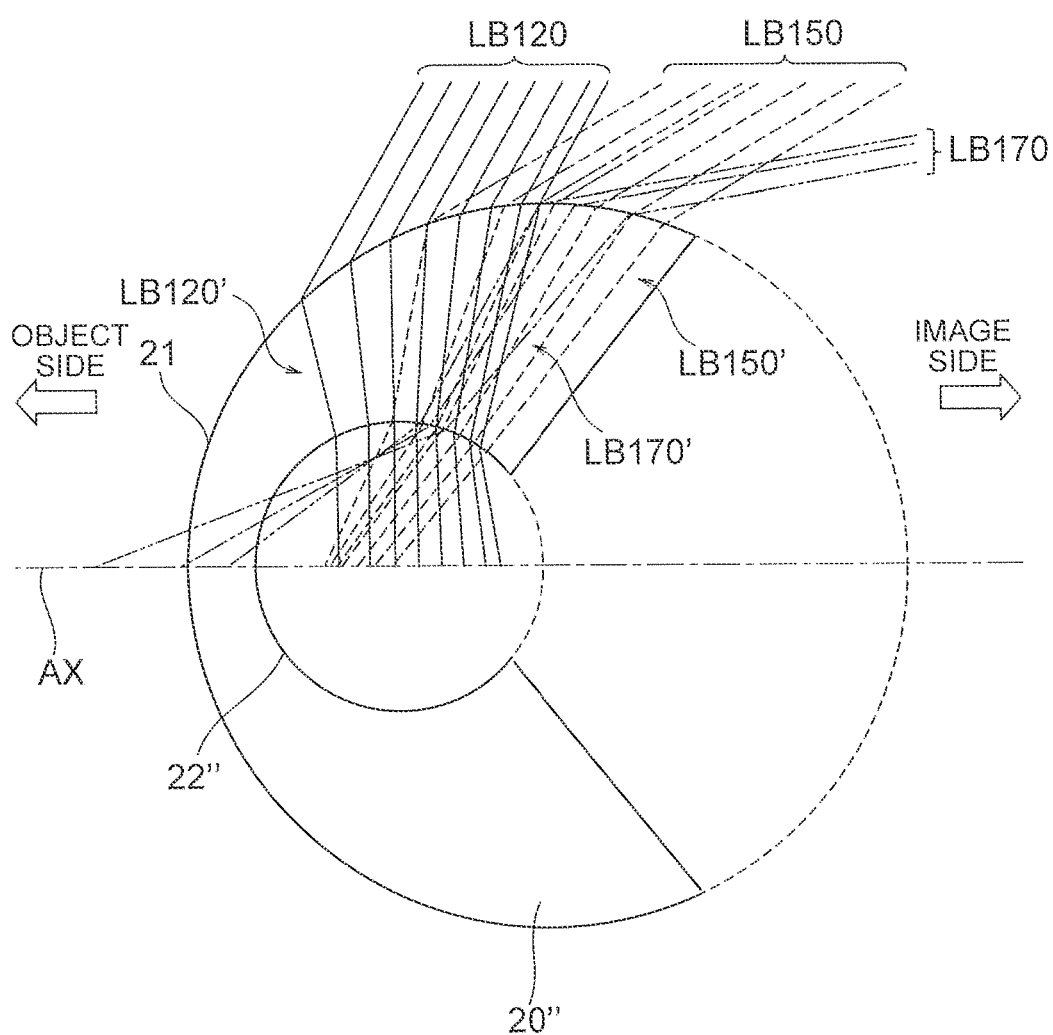
FIG. 6 is a diagram showing a case in which an image-side surface is shifted toward an image side.

FIG. 6 is a diagram showing a case in which an image-side surface is shifted toward an image side. Same reference numerals are assigned to components that are same as in FIG. 4, and description thereof is omitted. Positions of light rays incident on a meniscus lens 20" are same as the positions of light rays incident on the meniscus lens 20 shown in FIG. 4.

The meniscus lens 20" has the object-side surface 21 and an image-side surface 22". A radius of curvature of the image-side surface 22" is same as the radius of curvature of the image-side surface 22. The image-side surface 22" is shifted toward the image side along the optical axis AX by only 1 mm from the position of the image-side surface 22.

At the meniscus lens 20", all light rays incident on the object-side surface 21 emerge from the image-side surface 22". In other words, at the image-side surface 22", reflection by total reflection does not occur. However, in the meniscus lens 20", a light-ray group LB170' refracted at the image-side surface 22" travels toward the object side.

As shown in FIG. 6, even in the meniscus lens 20", the light-ray group LB170' refracted at the image-side surface 22 travels toward the object side. However, in the meniscus lens 20", a light ray emerged from the image-side surface 22" travels toward the object side to be further distant from the object-side surface 21, as compared to a light ray emerged from the image-side surface 22. Consequently, in the meniscus lens 20", it becomes difficult to form an optical image by the light-ray group LB170 as compared to that in the meniscus lens 20.

As just described, in a case in which the position of the image-side surface has shifted toward the image side, a light-ray group with a wide angle of view, when emerged from the image-side surface, travels toward the object side so as to be further distant from the object-side surface. Consequently, in the light-ray group with a wide angle of view, it becomes extremely difficult to form an optical image. As a result, it becomes extremely difficult to secure a wide observation range.

A case in which a radius of curvature of the image-side surface is changed will be described below by using FIG. 7. Moreover, a case in which the radius of curvature of the image-side surface and a position of the image-side surface are changed will be described below by referring to FIG. 8.

Figure 7:
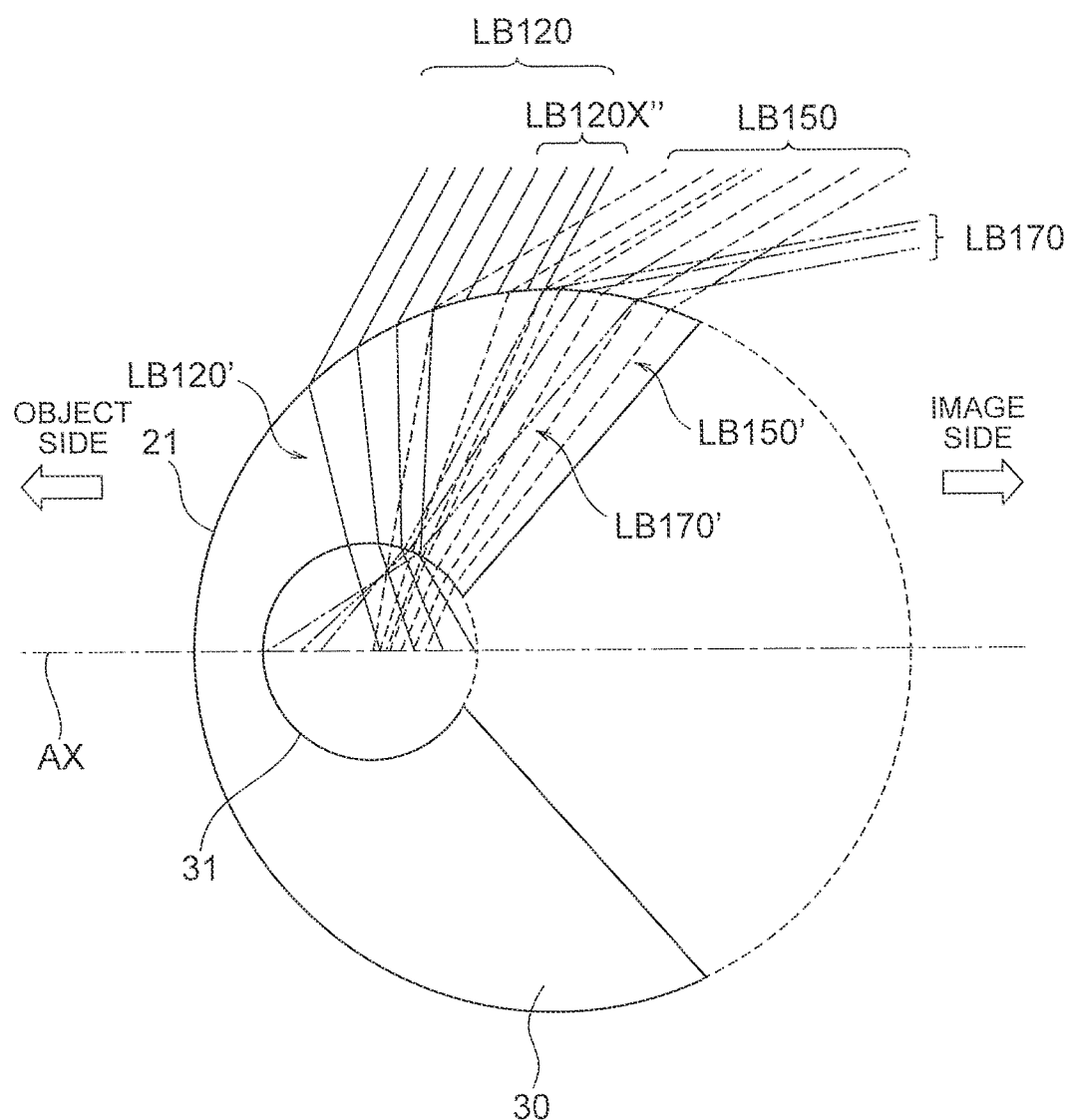
FIG. 7 is a diagram showing a case in which a radius of curvature of an image-side surface is made small.

FIG. 7 is a diagram showing a case in which the radius of curvature of the image-side surface is made small. Same reference numerals are assigned to components that are same as in FIG. 4, and description thereof is omitted. Positions of light rays incident on a meniscus lens 30 are same as the positions of light rays incident on the meniscus lens 20 shown in FIG. 4.

The meniscus lens 30 has the object-side surface 21 and an image-side surface 31. A radius of curvature of the image-side surface 31 is smaller than the radius of curvature of the image-side surface 22. The radius of curvature of the image-side surface 31 is 3 mm and the radius of curvature of the image-side surface 22 is 4 mm.

A center of curvature of the image-side surface 31, similarly as the image-side surface 22, coincides with a position P'. Accordingly, a central thickness of the meniscus lens 30 is thicker than a central thickness of the meniscus lens 20.

With respect to a light-ray group LB120X", light ray which travels from the object-side surface 21 up to the image-side surface 31 is not depicted. This is because, at the image-side surface 31, the light-ray group LB120X" is reflected by total reflection.

FIG. 7 indicates that with respect to a light-ray group with a small half angle of view, some light rays of the light-ray group incident on the object-side surface 21 do not emerge from the meniscus lens 30.

As just described, when the radius of curvature of the image-side surface becomes small, at the image-side surface, some light rays of the light-ray group with a narrow angle of view are reflected by total reflection. Consequently, in the light-ray group with a narrow angle of view, only some light rays of the light-ray group incident on the object-side surface emerge from the meniscus lens. As a result, an optical image formed by the light-ray group with a narrow angle of view becomes dark.

Figure 8:
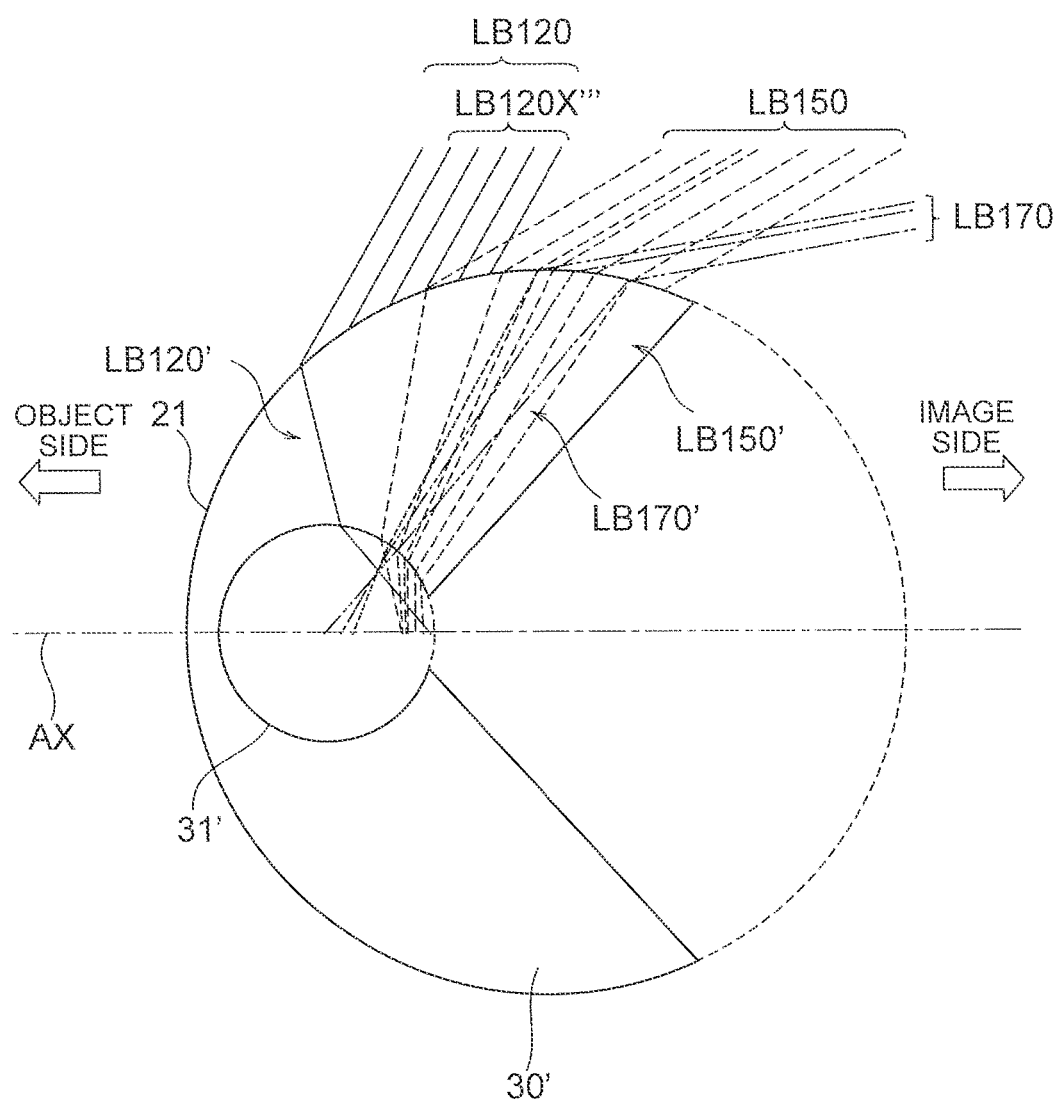
FIG. 8 is a diagram showing a case in which the radius of curvature of the image-side surface and a position of the image-side surface are changed.

FIG. 8 is a diagram showing a case in which the radius of curvature of the image-side surface and a position of the image-side surface are changed. In FIG. 8, the radius of curvature of the image-side surface is made small and the image-side surface is shifted toward the image side. Same reference numerals are assigned to components that are same as in FIG. 4, and description thereof is omitted. Positions of light rays incident on a meniscus lens 30' are same as the positions of the light rays incident on the meniscus lens 20 shown in FIG. 4.

The meniscus lens 30' has the object-side surface 21 and an image-side surface 31'. A radius of curvature of the image-side surface 31' is smaller than the radius of curvature of the image-side surface 22. The radius of curvature of the image-side surface 31' is 3 mm and the radius of curvature of the image-side surface 22 is 4 mm.

The image-side surface 31' is shifted from the position of the image-side surface 22 toward the image side along the optical axis AX. A central thickness of the meniscus lens 30' is same as the central thickness of the meniscus lens 20.

With respect to a light-ray group LB120X''', light ray which travels from the object-side surface 21 up to the image-side surface 31' is not depicted. This is because, at the image-side surface 31', the light-ray group LB120X''' is reflected by total reflection. Moreover, the number of light rays in the light-ray group LB120X''' is larger than the number of light rays in the light-ray group LB120X.

FIG. 8 indicates that with respect to a light-ray group with a small half angle of view, some light rays of the light-ray group incident on the object-side surface 21 do not emerge from the meniscus lens 30', and the light rays not emerging from the meniscus lens 30' increase.

As just described, even in a case in which the radius of curvature of the image-side surface becomes small and also the position of the image-side surface is shifted toward the object side, at the image-side surface, some light rays of the light-ray group with a narrow angle of view are reflected by total reflection. Furthermore, the number of light rays reflected by total reflection becomes large. Consequently, an optical image formed by the light-ray group with a narrow angle of view becomes even darker.

Among the light rays that can be incident on the object-side surface 21, a light ray with the widest angle of view is a light ray with a half angle of view of 180°. The light ray with a half angle of view of 180° is a light ray which travels in parallel to the optical axis AX from the image side toward the object side.

Figure 9:
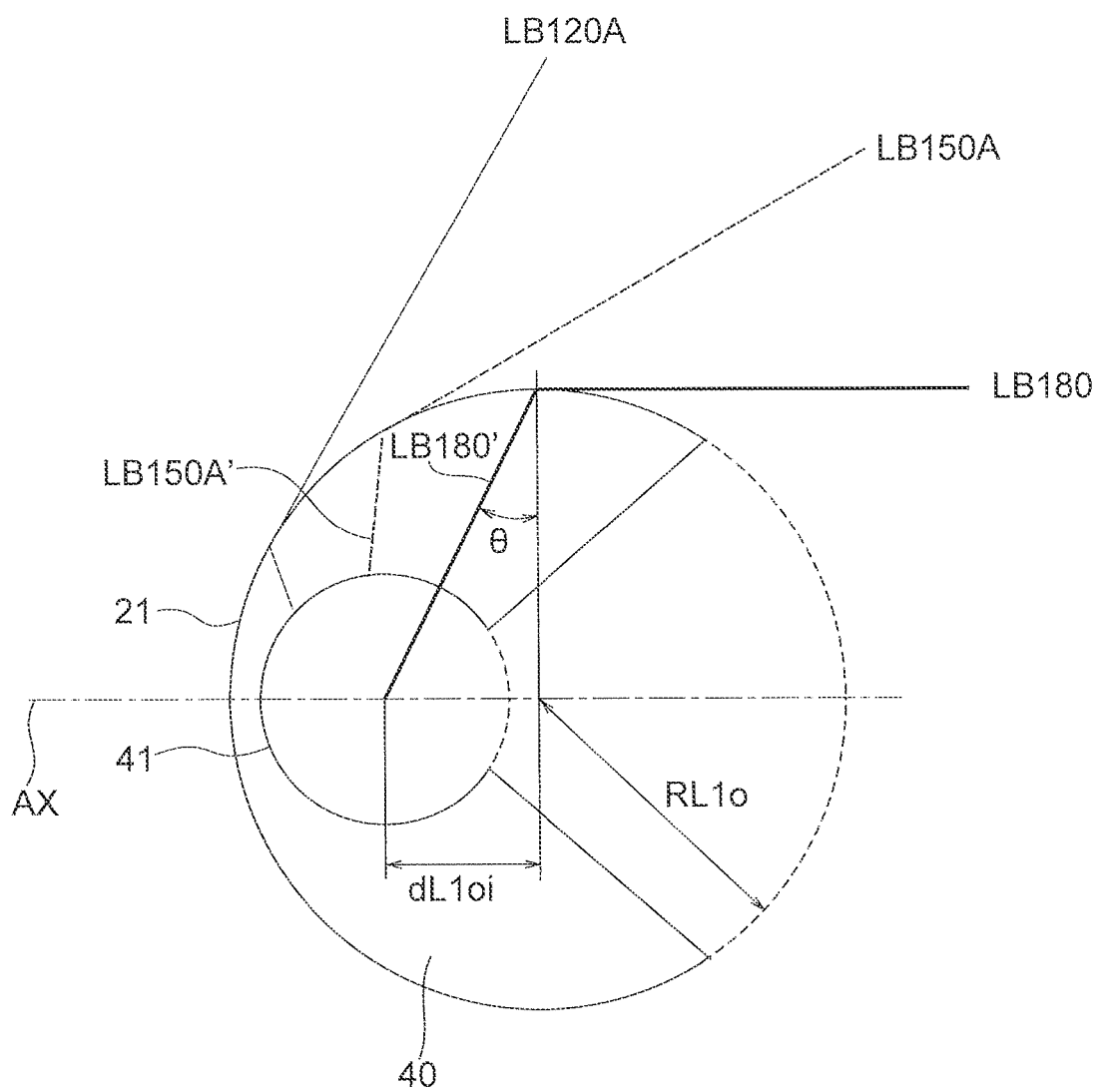
FIG. 9 is a diagram showing a relationship of a light ray having a half angle of view of 1800 and a first meniscus lens.

FIG. 9 is a diagram showing a relationship of a light ray with a half angle of view of 180° and a first meniscus lens. Same reference numerals are assigned to components that are same as in FIG. 3, and description thereof is omitted. In FIG. 9, a light ray with a half angle of view of 180° (hereinafter, referred to as 'light ray LB180') is indicated by a thick solid line.

A first meniscus lens 40 has the object-side surface 21 and an image-side surface 41. The light ray LB180, after being refracted at the object-side surface 21, is incident on an interior of the first meniscus lens 40. The light ray LB180 is incident on the first meniscus lens 40 at an angle θ. The angle θ is a critical angle.

A light ray LB180' is a light ray after being refracted at the object-side surface 21. The light ray LB180' reaches the image-side surface 41.

In the meniscus lens 20, a center of curvature of the image-side surface 22 coincides with a point of intersection of a light ray LB150A' and the optical axis AX. Consequently, at the image-side surface 22, the light ray LB150A' is incident perpendicularly with respect to the tangential plane.

Whereas, in the first meniscus lens 40, a center of curvature of the image-side surface 41 coincides with a point of intersection of the light ray LB180' and the optical axis AX. Consequently, at the image-side surface 22, the light ray LB180' is incident perpendicularly with respect to the tangential plane.

As a result, the light ray LB180' emerges from the image-side surface 41 without being refracted at the image-side surface 41. As a result, in the first meniscus lens 40, it is possible to make a light ray with an angle of incidence close to 90° emerge from the image-side surface 41.

As just described, the light ray emerging from the image-side surface is determined according to the positional relationship of the object-side surface and the image-side surface. Moreover, as the radius of curvature of the object-side surface changes, the light rays emerging from the image-side surface differ. Furthermore, as the critical angle θ changes, the position of the image-side surface changes. The critical angle θ is determined by the refractive index of the meniscus lens.

Therefore, the light ray emerging from the image-side surface is determined according to the radius of curvature of the object-side surface, the positional relationship of the object-side surface and the image-side surface, and the refractive index of the meniscus lens.

In conditional expression (1), RL1o is a parameter indicating the radius of curvature of the object-side surface, dL1oi is a parameter indicating the positional relationship of the object-side surface and the image-side surface, and ndL1 is a parameter indicating the refractive index. Therefore, by satisfying conditional expression (1), it is possible to make even a light ray with a wide angle of view and with the angle of incidence close to 90° emerge from the image-side surface. As a result, it is possible to achieve a wide angle of view.

Figure 10:
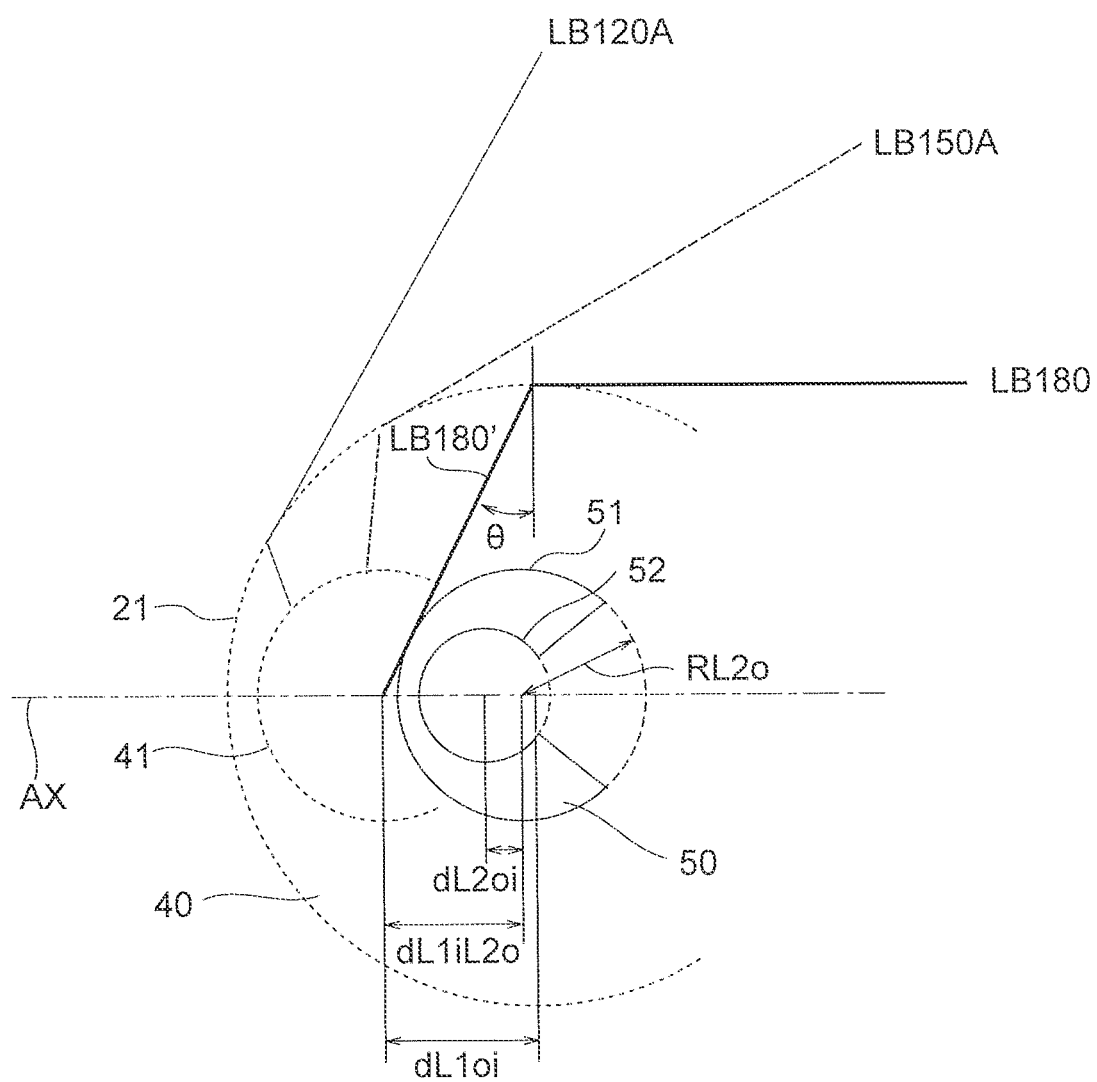
FIG. 10 is a diagram showing a relationship of a light ray having a half angle of view of 1800 and a second meniscus lens.

FIG. 10 is a diagram showing a relationship of a light ray with a half angle of view of 1800 and a second meniscus lens. Same reference numerals are assigned to components that are same as in FIG. 9, and description thereof is omitted.

A second meniscus lens 50 has an object-side surface 51 and an image-side surface 52. A light ray LB180' reaches the object-side surface 51 without being refracted at the image-side surface 41. The light ray LB180', after being refracted at the object-side surface 51, is incident on an interior of the second meniscus lens 50.

An angle made by the light ray LB180' and the optical axis AX is about 120°. Therefore, a light ray with the half angle of view of 120° reaches the object-side surface 51. Due to the refraction at the object-side surface 51, the light ray with the angle of view of 120° is converted to a light ray with the angle of view smaller than 120°. The light ray refracted by the object-side surface 51 is further refracted at the image-side surface 52.

In the first meniscus lens 40 and the second meniscus lens 50, the light ray with the half angle of view of 1800 is converted to a light ray with the angle of view of 60°.

Although the description in detail is omitted, even in the second meniscus lens 50, the light ray emerging from the image-side surface is determined according to the positional relationship of the object-side surface and the image-side surface. Moreover, as the radius of curvature of the object-side surface changes, the light ray emerging from the image-side surface differs. Moreover, an angle of refraction is determined by the refractive index of the meniscus lens.

As just described, the light ray emerging from the image-side surface is determined according to the radius of curvature of the object-side surface, the positional relationship of the object-side surface and the image-side surface, and the refractive index of the meniscus lens.

In conditional expression (2), $RL2o$ is a parameter indicating the radius of curvature of the object-side surface, $dL2oi$ is a parameter indicating the positional relationship of the object-side surface and the image-side surface, and $ndL2$ is a parameter indicating the refractive index. Therefore, by satisfying conditional expression (2), it is possible to make even a light ray with a wide angle of view and with an angle of incidence close to 90° emerge from the image-side surface. As a result, it is possible to achieve a wide angle of view.

Figure 11:
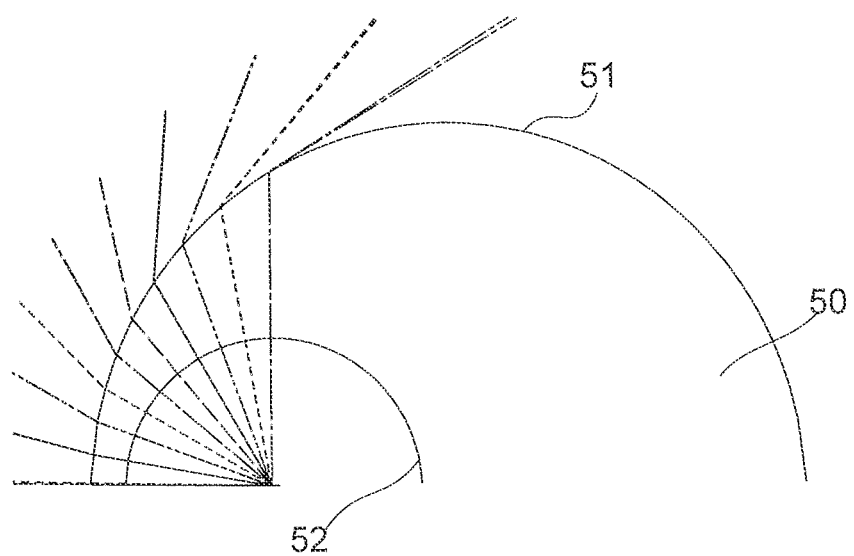
FIG. 11 is a diagram showing light rays on the second meniscus lens.
Figure 12:
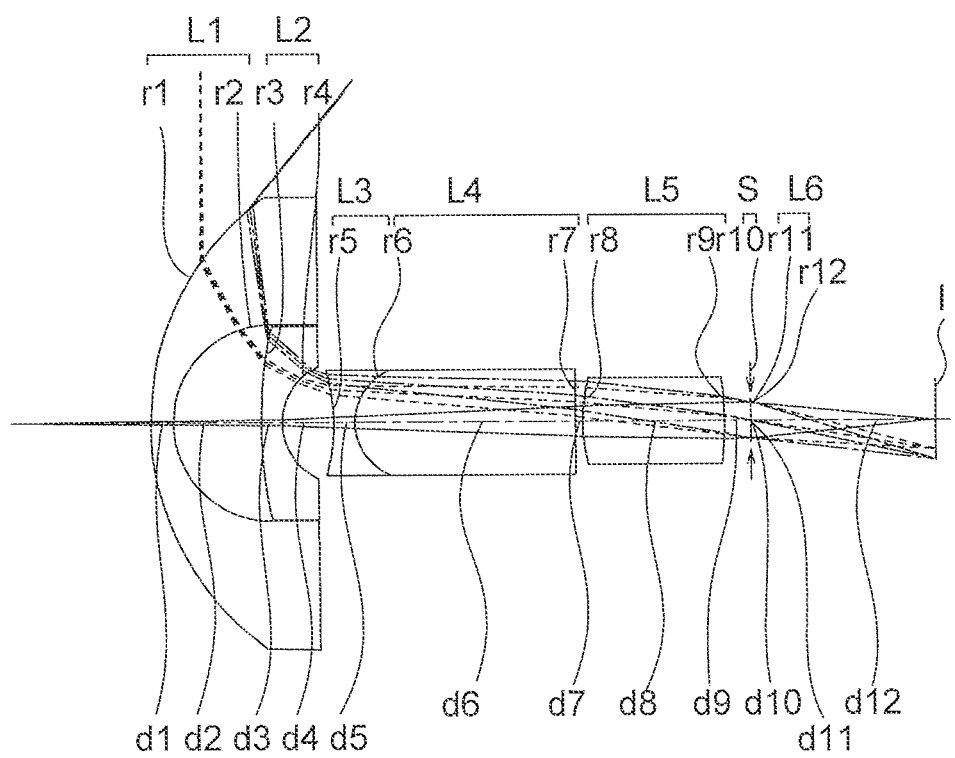
FIG. 12 is a lens cross-sectional view of an optical system having a set of negative meniscus lenses of an example 1.
Figure 13:
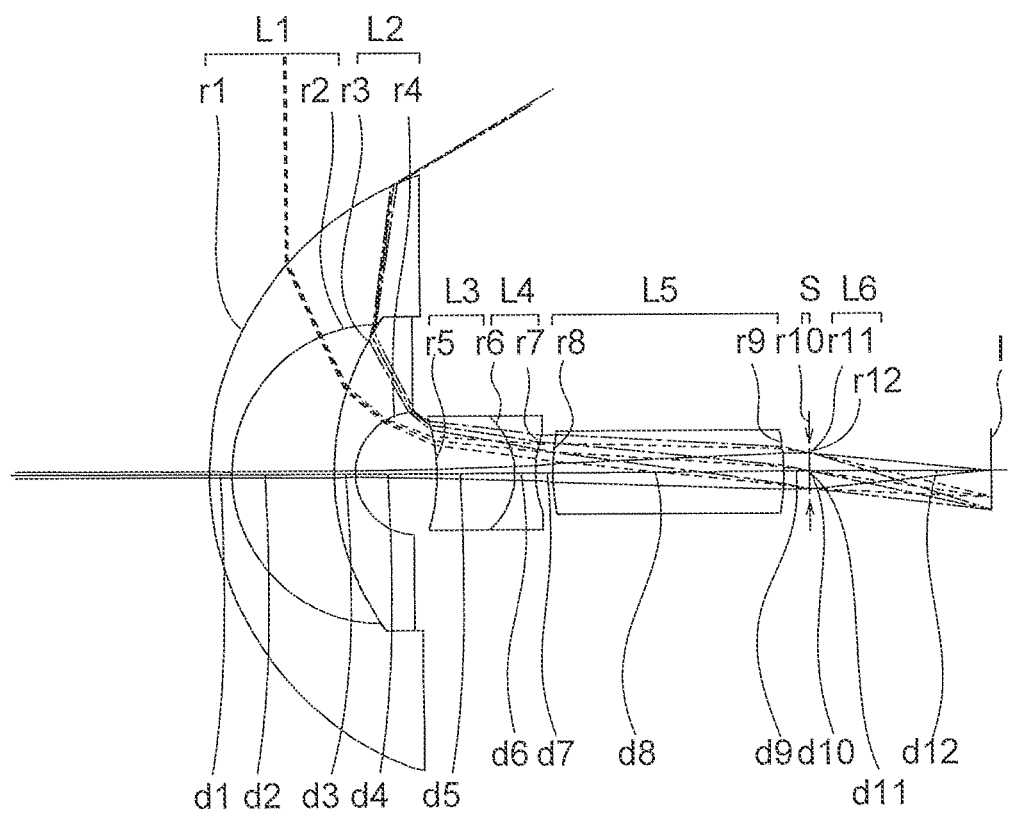
FIG. 13 is a lens cross-sectional view of an optical system having a set of negative meniscus lenses of an example 2.
Figure 14:
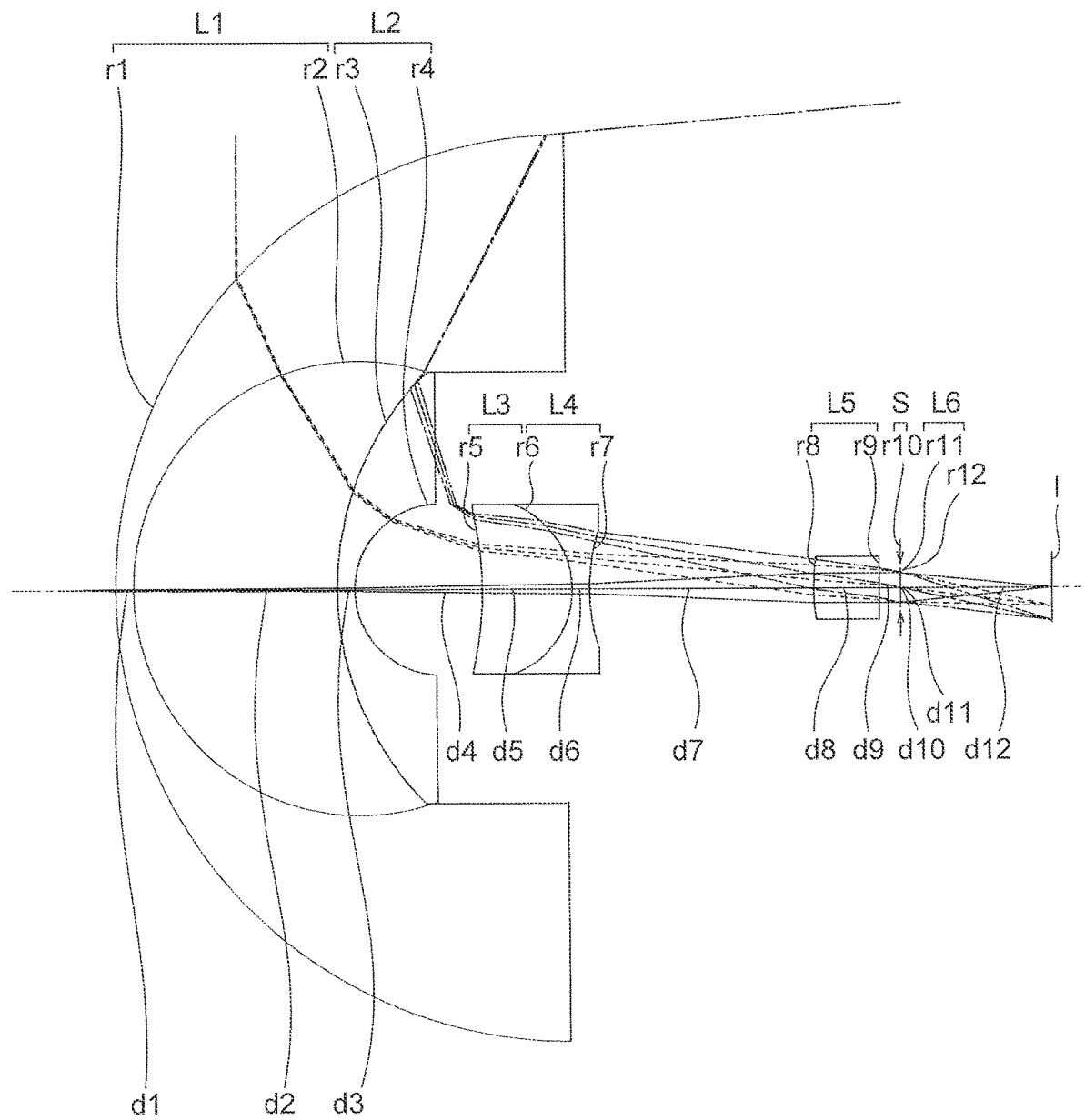
FIG. 14 is a lens cross-sectional view of an optical system having a set of negative meniscus lenses of an example 3.
Figure 15:
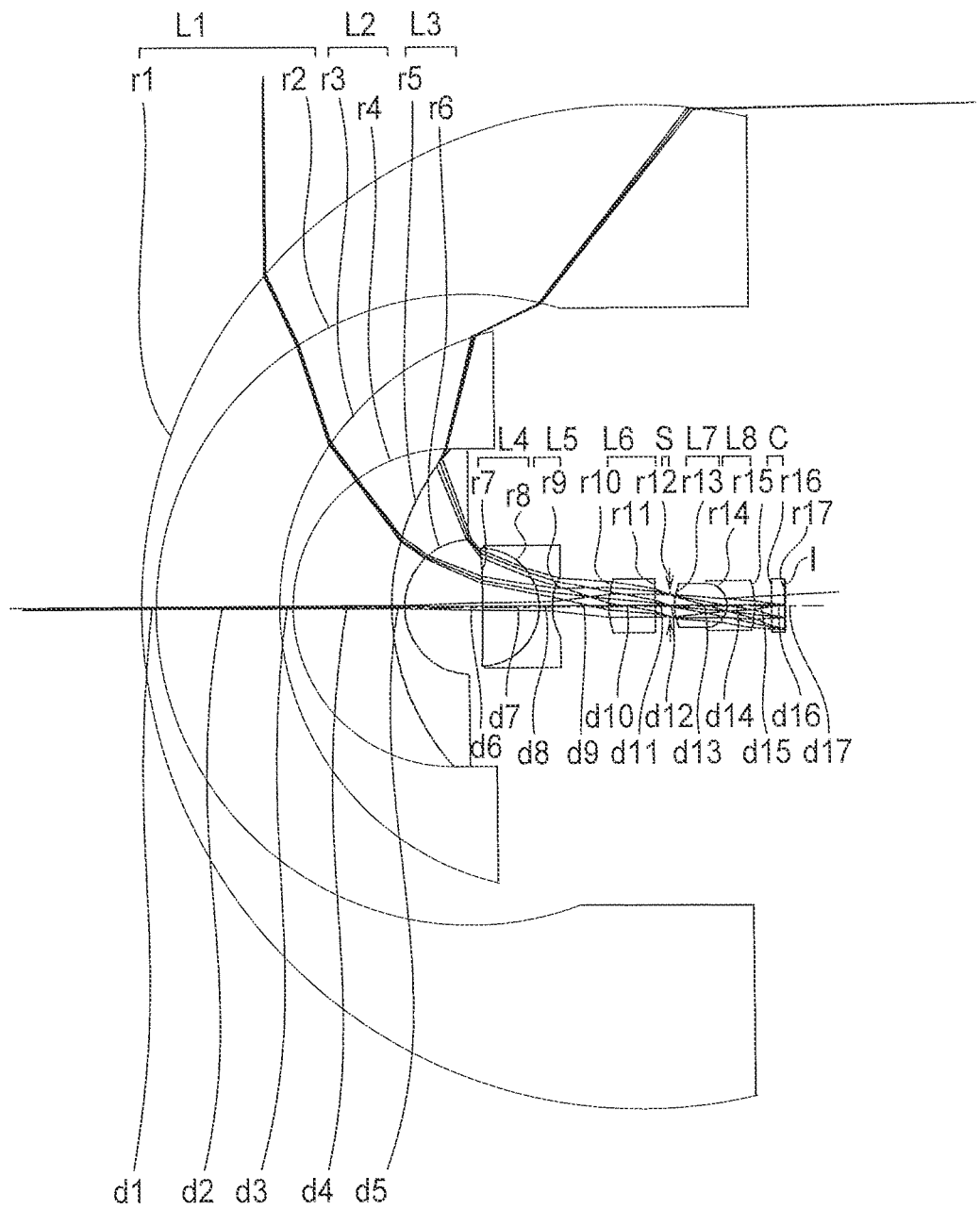
FIG. 15 is a lens cross-sectional view of an optical system having a set of negative meniscus lenses of an example 4.
Figure 16:
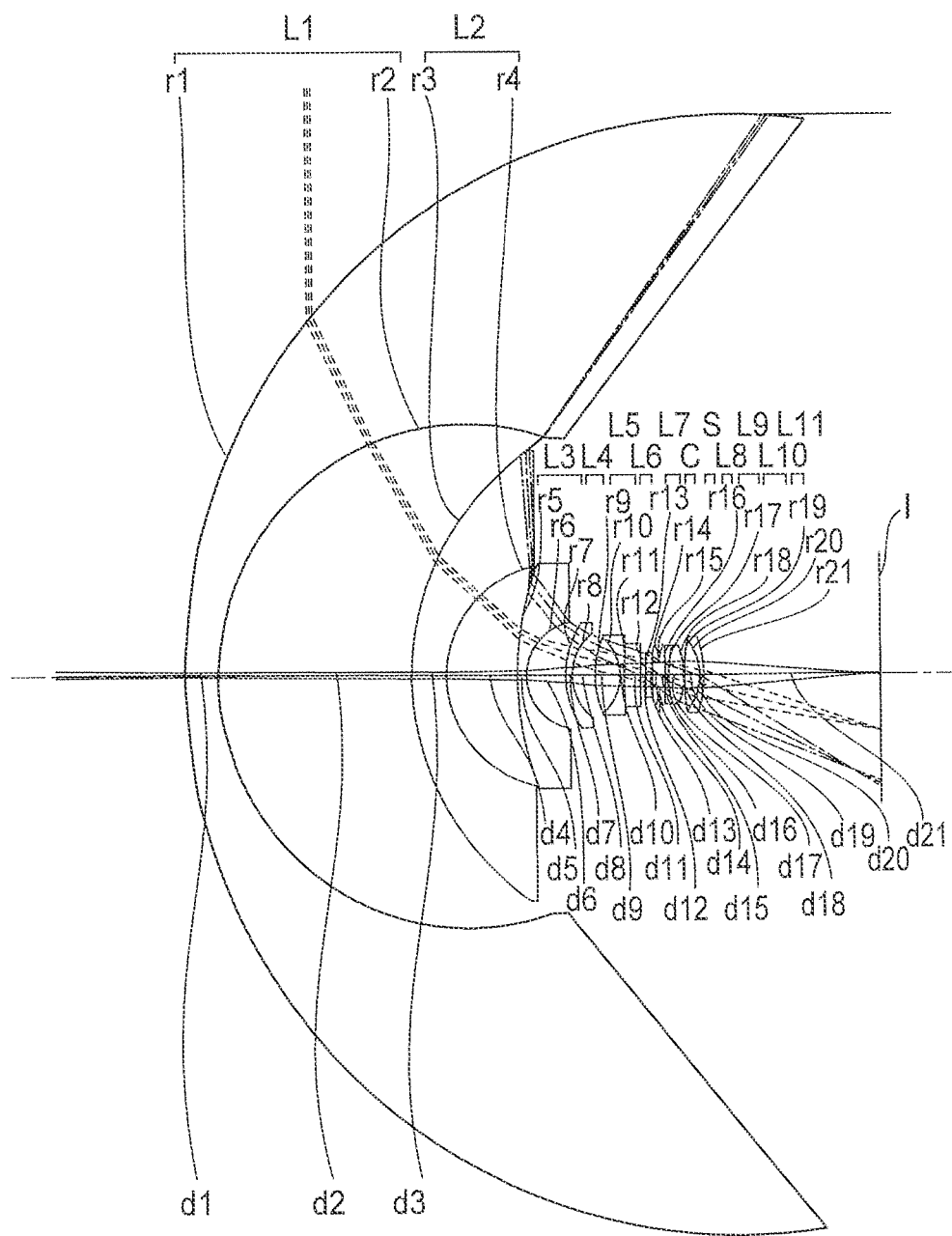
FIG. 16 is a lens cross-sectional view of an optical system having a set of negative meniscus lenses of an example 5.
Figure 17:
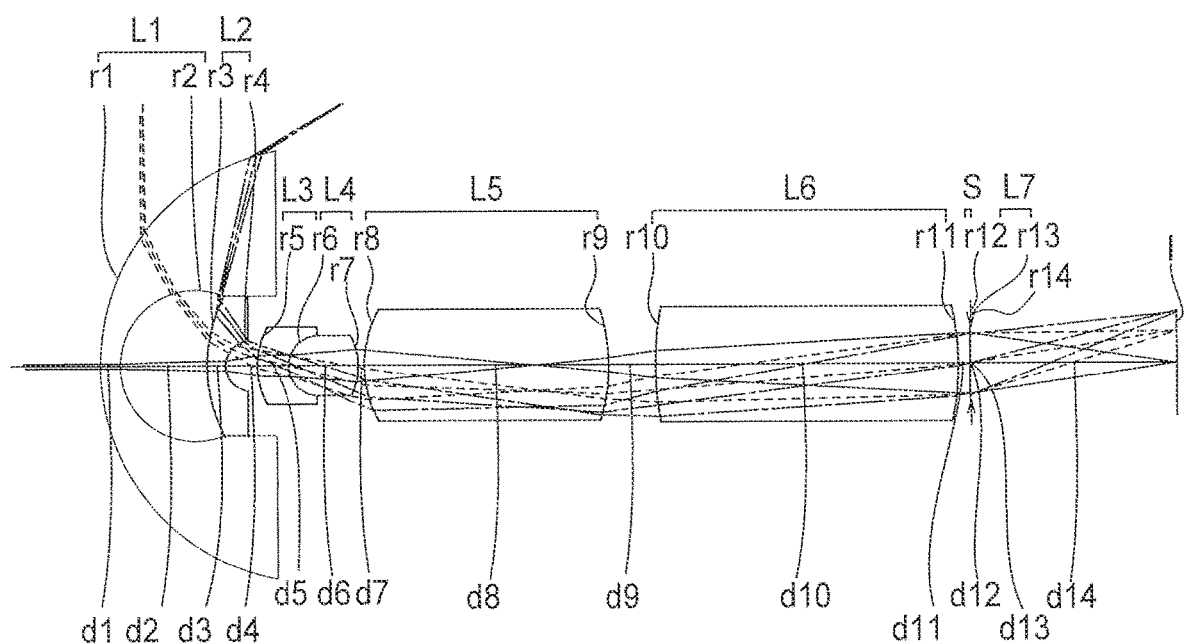
FIG. 17 is a lens cross-sectional view of an optical system having a set of negative meniscus lenses of an example 6.
Figure 18:
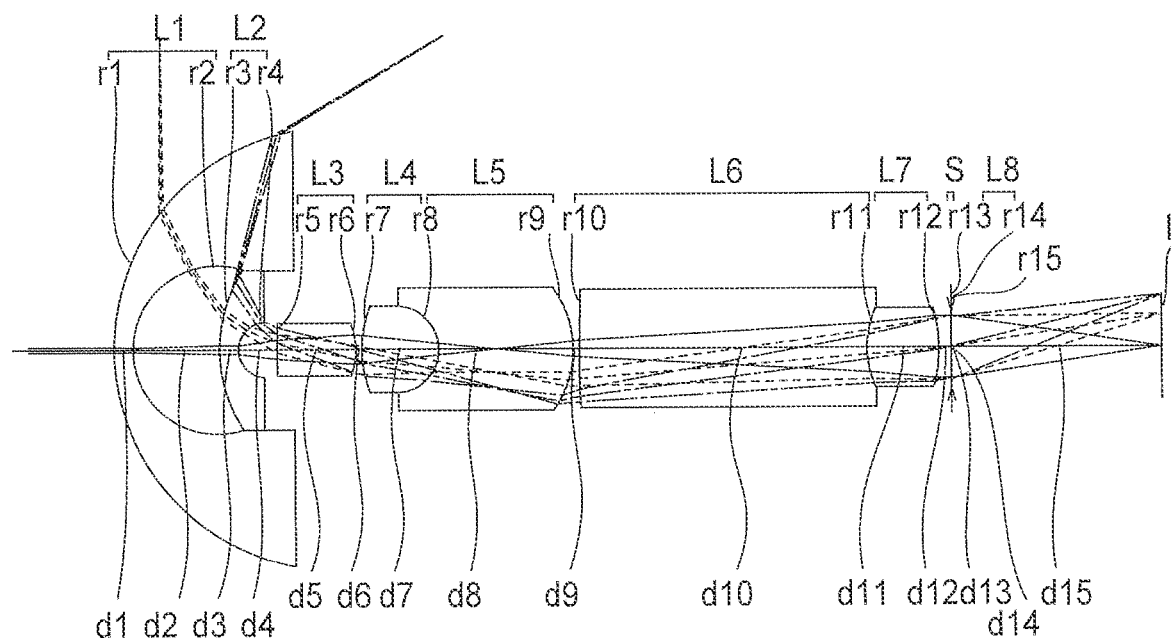
FIG. 18 is a lens cross-sectional view of an optical system having a set of negative meniscus lenses of an example 7.
Figures 19A, 19F:
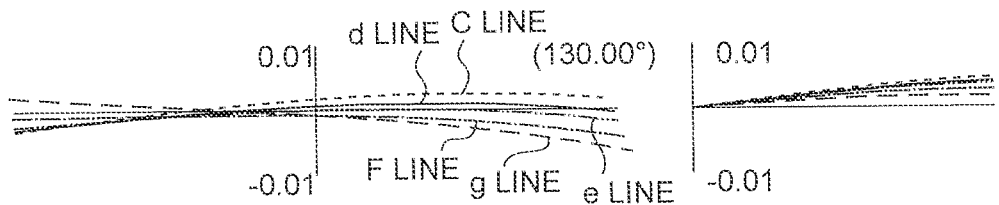
FIG. 19A, FIG. 19B, FIG. 19C, FIG. 19D, FIG. 19E, FIG. 19F, FIG. 19G, FIG. 19H, FIG. 19I, and FIG. 19J are aberration diagrams of the optical system of the example 1.
Figures 19B, 19G:
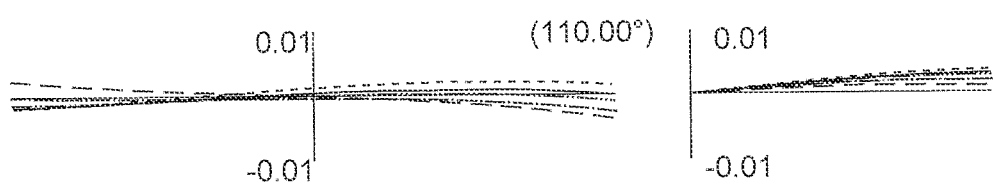
Figures 19C, 19H:
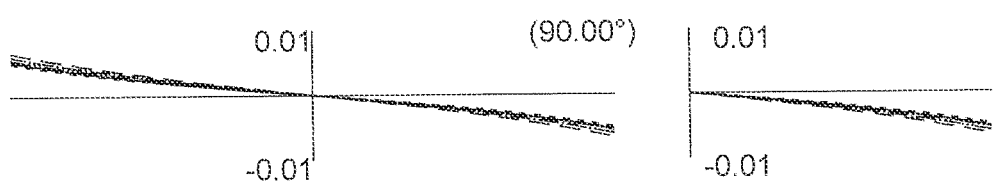
Figures 19D, 19I:
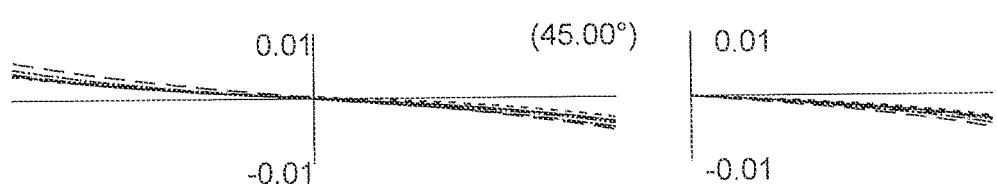
Figures 19E, 19J:
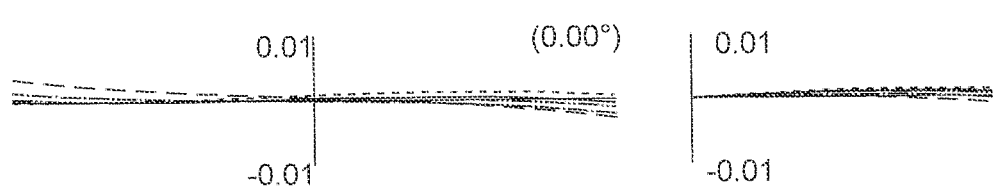

FIG. 11 is a diagram showing light rays on the second meniscus lens. In FIG. 11, light rays, when reverse-traced from a center of curvature of the image-side surface 52, are depicted. Light rays with an angle of view of 0° up to an angle of view of 120° emerge from the object-side surface 51.

By satisfying conditional expressions (1) and (2), it is possible to make a light ray with a wide angle of view and with an angle of incidence close to 90° emerge from the image-side surface. As just described, conditional expressions (1) and (2) are conditional expressions for achieving a wide angle of view.

$RL1o/ndL1$ in conditional expression (1) indicates a distance between a first point of intersection and the center of curvature of the object-side surface of the first meniscus lens. The first point of intersection is a point at which a light ray incident to be tangential to the object-side surface of the first meniscus lens intersects the optical axis.

$RL2o/ndL2$ in conditional expression (1) indicates a distance between a second point of intersection and the center of curvature of the object-side surface of the second meniscus lens. The second point of intersection is a point at which a light ray incident to be tangential to the object-side surface of the second meniscus lens intersects the optical axis.

In a case in which a value falls below a lower limit value of conditional expression (1), it is possible to achieve a wide angle of view in an optical system in which the set of negative meniscus lenses of the present embodiment is used. However, in the first meniscus lens, it becomes difficult to secure adequately a thickness on the optical axis.

Moreover, even when a light ray with a large angle of view is assumed to have passed through the object-side surface of the first meniscus lens, the light ray is reflected by total reflection at the image-side surface of the first meniscus lens. Consequently, a light ray with a large angle of view ceases to emerge from the first meniscus lens.

In a case in which the value exceeds an upper limit value of conditional expression (1), a refractive effect as the negative meniscus lens becomes weak in the first meniscus lens. In this case, an effect of widening the angle of view becomes small in the first meniscus lens. Consequently, in an optical system in which the set of negative meniscus lenses of the present embodiment is used, it is not possible to achieve a wide angle of view.

In a case in which a value falls below a lower limit value of conditional expression (2), it is possible to achieve a wide angle of view in an optical system in which the set of negative meniscus lenses of the present embodiment is used. However, in the second meniscus lens, it becomes difficult to secure adequately a thickness on the optical axis.

Moreover, even when a light ray with a large angle of view is assumed to have passed through the object-side surface of the second meniscus lens, the light ray is reflected by total reflection at the image-side surface of the second meniscus lens. Consequently, a light ray with a large angle of view ceases to emerge from the second meniscus lens.

In a case in which the value exceeds an upper limit value of conditional expression (2), a refractive effect as the negative meniscus lens becomes weak in the second meniscus lens. In this case, an effect of widening the angle of view becomes small in the second meniscus lens. Consequently, in an optical system in which the set of negative meniscus lenses of the present embodiment is used, it is not possible to achieve a wide angle of view.

In the set of negative meniscus lenses of the present embodiment, it is preferable that following conditional expressions (3) and (4) be satisfied:

$$1.5 < RL1o/RL1i < 3.0 \quad (3)$$

$$0.2 < (DL1+DL12)/RL1o < 0.7 \quad (4)$$

where, $RL1o$ denotes the radius of curvature an object-side surface of the first meniscus lens, $RL1i$ denotes a radius of curvature of an image-side surface of the first meniscus lens, $DL1$ denotes a distance on an optical axis between the object-side surface of the first meniscus lens and the image-side surface of the first meniscus lens, and $DL12$ denotes a distance on the optical axis between the image-side surface of the first meniscus lens and an object-side surface of the second meniscus lens.

Conditional expression (3) is a conditional expression related to an outer diameter of the first meniscus lens. The outer diameter of the first meniscus lens has an effect on an outer diameter of an optical system in which the set of negative meniscus lenses of the present embodiment is used. Accordingly, conditional expression (3) can be said to be a conditional expression related to the outer diameter of an optical system in which the set of negative meniscus lenses of the present embodiment is used.

In a case in which a value falls below a lower limit value of conditional expression (3), in an optical system in which the set of meniscus lenses of the present embodiment is used, an increase in the outer diameter is suppressed. However, in the first meniscus lens, it is not possible to achieve adequately an effect of widening the angle of view. Consequently, in an optical system in which the set of negative meniscus lenses of the present embodiment is used, it is not possible to achieve a wide angle of view.

In a case in which the value exceeds an upper limit value of conditional expression (3), the outer diameter of the set of negative meniscus lenses becomes excessively large. Consequently, in an optical system in which the set of negative meniscus lenses of the present embodiment is used, the outer diameter becomes large.

Conditional expression (4) is a conditional expression for a light ray with the maximum angle of view to be incident from the first meniscus lens on the second meniscus lens. Conditional expression (4) is a conditional expression related to the thickness on the optical axis of the first meniscus lens and the distance between the first meniscus lens and the second meniscus lens.

In a case in which a value falls below a lower limit value of conditional expression (4), the distance between the first meniscus lens and the second meniscus lens becomes excessively short. In this case, the light ray with the maximum angle of view is directed toward the center of curvature of the image-side surface of the first meniscus lens. Consequently, at the image-side surface of the first meniscus lens, the light ray with the maximum angle of view is directed toward the object-side surface of the second meniscus lens without being refracted almost at all.

In a case in which the value exceeds an upper limit value of conditional expression (4), the distance between the first meniscus lens and the second meniscus lens becomes excessively long. Consequently, some light rays emerged from the first meniscus lens do not reach the object-side surface of the second meniscus lens.

In the set of negative meniscus lenses of the present embodiment, it is preferable that following conditional expressions (5), (6), and (7) be satisfied:

$$0.5 < dL1oi/RL1i < 1.7 \quad (5)$$

$$0.3 < dL1iL2o/RL2o < 1.1 \quad (6)$$

$$0.7 < dL2oi/RL2i < 6.0 \quad (7)$$

where,

RL1$i$ denotes the radius of curvature of an image-side surface of the first meniscus lens, RL2$o$ denotes the radius of curvature of an object-side surface of the second meniscus lens, RL2$i$ denotes a radius of curvature of an image-side surface of the second meniscus lens, dL1$oi$ denotes the distance between the center of curvature of an object-side surface of the first meniscus lens and the center of curvature of the image side surface of the first meniscus lens, dL1$i$L2$o$ denotes a distance between the center of curvature of the image side surface of the first meniscus lens and the center of curvature of the object-side surface of the second meniscus lens, and dL2$oi$ denotes the distance between the center of curvature of the object-side surface of the second meniscus lens and the center of curvature of the image-side surface of the second meniscus lens.

Conditional expressions (5) and (7) are conditional expressions related to an effect of converging light rays with a wide angle of view by the lenses.

In a case in which a value falls below a lower limit value of conditional expression (5), it is not possible to achieve adequately the effect of converging the light rays with a wide angle of view. Consequently, it becomes difficult to widen the angle of view.

In a case in which the value exceeds an upper limit value of conditional expression (5), some of the light rays that have reached the image-side surface of the first meniscus lens are reflected by total reflection at the image side surface. Moreover, in the first meniscus lens, it becomes difficult to secure adequately a thickness on the optical axis.

An air layer is formed between the first meniscus lens and the second meniscus lens. Both sides of the air layer are spherical surfaces. Moreover, a refractive index difference occurs between the first meniscus lens and the air layer. A refractive index difference occurs between the second meniscus lens and the air layer. Accordingly, the air layer functions as a lens. Here, the air layer is referred to as air lens.

Conditional expression (6) is a conditional expression related to the function of the air lens. A shape of the air lens is a positive meniscus shape. A refractive index on both sides of the air lens is higher with respect to air. Consequently, the air lens functions as a negative meniscus lens.

In a case in which a value falls below a lower limit value of conditional expression (6), a negative effect becomes weak, and it is not possible to achieve a wide angle of view. In a case in which the value exceeds an upper limit value of conditional expression (6), the angle of view becomes excessively wide and light rays cease to pass through the second meniscus lens.

In the set of negative meniscus lenses of the present embodiment, it is preferable that the predetermined lens surface be a surface which is convex on the object side.

When used in a wide-angle optical system, even in the angle of view not smaller than 240°, it is possible to correct various aberrations favorably.

A wide-angle optical system of the present embodiment is a wide-angle optical system having an angle of view not smaller than 240°, and includes the set of negative meniscus lenses of the present embodiment and a lens which is disposed on an image side of the set of the negative meniscus lenses.

According to the wide-angle optical system of the present embodiment, various aberrations are corrected favorably, and it is possible to realize an optical system having an angle of view not smaller than 240°.

An image pickup apparatus of the present embodiment includes a wide-angle optical system of the present embodiment, and an image sensor which is disposed on an image side of the wide-angle optical system. The image sensor has an image pickup surface, and converts an image formed on the image pickup surface by the wide-angle optical system to an electric signal.

According to the image pickup apparatus of the present embodiment, it is possible to pick up clearly a range corresponding to the angle of view not smaller than 2400.

A projection apparatus of the present embodiment includes a wide-angle optical system according to the present embodiment, and a display element which is disposed on an image side of the wide-angle optical system. The display element has a display surface, and an image displayed on the display surface is projected on an object side by the wide-angle optical system.

According to the image pickup apparatus of the present embodiment, it is possible to project a sharp image in a range corresponding to the angle of view not smaller than 240°.

Examples of the set of negative meniscus lenses will be described below in detail by referring to the accompanying diagrams. However, the present disclosure is not restricted to the examples described below.

The set of meniscus lenses is used in an optical system having an angle of view not smaller than 240°. Therefore, in each example, a lens is disposed on the image side of the set of negative meniscus lenses.

FIG. 12 to FIG. 18 are lens cross-sectional views of the examples. In the lens cross-sectional views, an aperture stop is denoted by S and an image plane is denoted by I. An ideal lens is indicated by one line.

FIG. 19A, FIG. 19B, FIG. 19C, FIG. 19D, FIG. 19E, FIG. 19F, FIG. 19G, FIG. 19H, FIG. 19I, and FIG. 19J are transverse aberration diagrams of an example 1.

FIG. 20A, FIG. 20B, FIG. 20C, FIG. 20D, FIG. 20E, FIG. 20F, FIG. 20G, FIG. 20H, FIG. 20I, and FIG. 20J are transverse aberration diagrams of an example 2.

A numerical value is put in a bracket at a center of the transverse aberration diagram. The numerical value indicates the angle of view. An aberration diagram on a left side of the bracket indicates a transverse aberration in a Y-direction (meridional direction), and an aberration diagram on a right side of the bracket indicates an aberration in an X-direction (sagittal direction).

A set of negative meniscus lenses of the example 1 includes a negative meniscus lens L1 having a convex surface directed toward an object side and a negative meniscus lens L2 having a convex surface directed toward the object side. An image-side surface of the negative meniscus lens L1 is a hemispherical surface.

Moreover, a wide-angle optical system includes in order from an object side, the set of negative meniscus lenses of the example 1, a biconcave negative lens L3, a planoconvex positive lens L4 having a convex surface directed toward the object side, a biconvex positive lens L5, and an ideal lens L6. The biconcave negative lens L3 and the planoconvex positive lens L4 are cemented.

An aperture stop S is disposed on an image side of the biconvex positive lens L5. The ideal lens L6 is disposed at a position of the aperture stop S. A parallel light beam emerges from the wide-angle optical system. The parallel light beam is focused by the ideal lens 6.

A set of negative meniscus lenses of the example 2 includes a negative meniscus lens L1 having a convex surface directed toward an object side and a negative meniscus lens L2 having a convex surface directed toward the object side. An image-side surface of the negative meniscus lens L1 and an image-side surface of the negative meniscus lens L2 are hemispherical surfaces.

Moreover, a wide-angle optical system includes in order from an object side, the set of negative meniscus lenses of the example 2, a positive meniscus lens L3 having a convex surface directed toward an image side, a biconcave negative lens L4, a biconvex positive lens L5, and an ideal lens L6. The positive meniscus lens L3 and the biconcave negative lens L4 are cemented.

An aperture stop S is disposed on the image side of the biconvex positive lens L5. The ideal lens L6 is disposed at a position of the aperture stop S. A parallel light beam emerges from the wide-angle optical system. The parallel light beam is focused by the ideal lens L6.

A set of negative meniscus lenses of an example 3 includes a negative meniscus lens L1 having a convex surface directed toward an object side and a negative meniscus lens L2 having a convex surface directed toward the object side. An object-side surface of the negative meniscus lens L1 is a hemispherical surface. An image-side surface of the negative meniscus lens L1 is a surface extending beyond hemisphere. An image-side surface of the negative meniscus lens L2 is a hemispherical surface.

Moreover, a wide-angle optical system includes in order from an object side, the set of negative meniscus lenses of the example 3, a positive meniscus lens L3 having a convex surface directed toward an image side, a biconcave negative lens L4, a planoconvex lens L5 having a convex surface directed toward the object side, and an ideal lens L6. The positive meniscus lens L3 and the biconcave negative lens L4 are cemented.

An aperture stop S is disposed on the image side of the biconvex positive lens L5. The ideal lens L6 is disposed at a position of the aperture stop S. A parallel light beam emerges from the wide-angle optical system. The parallel light beam is focused at the ideal lens L6.

A set of negative meniscus lenses of an example 4 includes a negative meniscus lens L1 having a convex surface directed toward an object side and a negative meniscus lens L2 having a convex surface directed toward the object side. An object-side surface of the negative meniscus lens L1 and an image-side surface of the negative meniscus lens L1 are surfaces extending beyond hemisphere. An image-side surface of the negative meniscus lens L2 is a hemispherical surface.

Moreover, a wide-angle optical system includes in order from an object side, the set of negative meniscus lenses of the example 4, a negative meniscus lens L3 having a convex surface directed toward the object side, a positive meniscus lens L4 having a convex surface directed toward an image side, a biconcave negative lens L5, a biconvex positive lens L6, a biconvex positive lens L7, and a negative meniscus lens L8 having a convex surface directed toward the image side.

The positive meniscus lens L4 and the biconcave negative lens L5 are cemented. The biconvex positive lens L7 and the negative meniscus lens L8 are cemented.

An aperture stop S is disposed between the biconvex positive lens L6 and the biconvex positive lens L7. A plane parallel plate C is disposed on the image side of the negative meniscus lens L8.

A set of negative meniscus lenses of an example 5 includes a negative meniscus lens L1 having a convex surface directed toward an object side and a negative meniscus lens L2 having a convex surface directed toward the object side. An object-side surface of the negative meniscus lens L1 and an image-side surface of the negative meniscus lens L1 are surfaces extending beyond hemisphere. An image side surface of the negative meniscus lens L2 is a hemispherical surface.

Moreover, a wide-angle optical system includes in order from an object side, the set of negative meniscus lenses of the example 5, a negative meniscus lens L3 having a convex surface directed toward the object side, a negative meniscus lens L4 having a convex surface directed toward the object side, a biconvex positive lens L5, a biconcave negative lens L6, a positive meniscus lens L7 having a convex surface directed toward the object side, a biconcave negative lens L8, a biconvex positive lens L9, a biconvex positive lens L10, and a negative meniscus lens L11 having a convex surface directed toward an image side.

The biconvex positive lens L5, the biconcave negative lens L6, and the positive meniscus lens L7 are cemented. The biconcave negative lens L8 and the biconvex positive lens L9 are cemented. The biconvex positive lens L10 and the negative meniscus lens L11 are cemented.

A plane parallel plate C and an aperture stop S are disposed between the positive meniscus lens L7 and the biconcave negative lens L8. The plane parallel plate C is disposed on the object side of the aperture stop S.

A set of negative meniscus lenses of an example 6 includes a negative meniscus lens L1 having a convex surface directed toward an object side and a negative meniscus lens L2 having a convex surface directed toward the object side. An object-side surface of the negative meniscus lens L1 is a hemispherical surface. An image-side surface of the negative meniscus lens L1 is a surface extending beyond hemisphere. An image-side surface of the negative meniscus lens L2 is a hemispherical surface.

Moreover, a wide-angle optical system includes in order from an object side, the set of negative meniscus lenses of the example 6, a negative meniscus lens L3 having a convex surface directed toward the object side, a biconvex positive lens L4, a biconvex positive lens L5, a biconvex positive lens L6, and an ideal lens L7. The negative meniscus lens L3 and the biconvex positive lens L4 are cemented.

An aperture stop S is disposed on an image side of the biconvex positive lens L6. The ideal lens L7 is disposed at a position of the aperture stop S. A parallel light beam emerges from the wide-angle optical system. The parallel light beam is focused by the ideal lens L7.

A set of negative meniscus lenses of an example 7 includes a negative meniscus lens L1 having a convex surface directed toward an object side and a negative meniscus lens L2 having a convex surface directed toward the object side. An object-side surface of the negative meniscus lens L1 is a hemispherical surface. An image-side surface of the negative meniscus lens L1 is a surface extending beyond hemisphere. An image-side surface of the negative meniscus lens L2 is a hemispherical surface.

Moreover, a wide-angle optical system includes in order from an object side, the set of negative meniscus lenses of the example 7, a biconvex positive lens L3, a biconvex positive lens L4, a negative meniscus lens L5 having a convex surface directed toward an image side, a negative meniscus lens L6 having a convex surface directed toward the object side, a biconvex positive lens L7, and an ideal lens L8.

The biconvex positive lens L4 and the negative meniscus lens L5 are cemented. The negative meniscus lens L6 and the biconvex positive lens L7 are cemented.

An aperture stop S is disposed on the image side of the biconvex positive lens L7. The ideal lens L8 is disposed at a position of the aperture stop S. A parallel light beam emerges from the wide-angle optical system. The parallel light beam is focused by the ideal lens L8.

Numerical data of each example described above is shown below. In Surface data, r denotes radius of curvature of each lens surface, d denotes a distance between respective lens surfaces, nd denotes a refractive index of each lens for d-line, vd denotes an Abbe number for each lens.

In various data, f denotes a focal length of the overall system, Fno denotes an F-number, ω denotes a half angle of view, φ denotes a diameter of a stop, and fi denotes a focal length of the ideal lens. In the example 6 and the example 7, an intermediate image is formed. Therefore, a value of f and a value of the Fno are negative values.

Example 1

Unit mm

Surface data

| Surface no. | r | d | nd | vd |
|---|---|---|---|---|
| Object plane | 14.000 | 14.000 | | |
| 1 | 3.8126 | 0.317 | 1.88300 | 40.76 |
| 2 | 1.3546 | 1.230 | | |
| 3 | 6.0338 | 0.300 | 1.88300 | 40.76 |
| 4 | 0.8439 | 0.722 | | |
| 5 | −2.5514 | 0.300 | 1.88300 | 40.76 |
| 6 | 0.7832 | 3.086 | 1.84666 | 23.77 |
| 7 | ∞ | 0.100 | | |
| 8 | 2.3607 | 1.987 | 1.48749 | 70.23 |
| 9 | −3.9154 | 0.360 | | |
| 10 (Stop) | ∞ | 0.000 | | |
| 11 | ∞ | 0.000 | | |
| 12 | ∞ | 2.590 | | |
| Image plane | ∞ | | | |

Various data

| | |
|---|---|
| f | 0.264 |
| Fno | 5.083 |
| ω | 130° |
| φ | 0.5 |
| fi | 2.59 |

Surface no. 11 denotes an ideal lens.
Example 2
Unit mm

Surface data

| Surface no. | r | d | nd | vd |
|---|---|---|---|---|
| Object plane | 14.000 | 14.000 | | |
| 1 | 4.3329 | 0.317 | 1.88300 | 40.76 |
| 2 | 2.0608 | 1.436 | | |
| 3 | 3.6545 | 0.300 | 1.88300 | 40.76 |
| 4 | 0.8464 | 1.139 | | |
| 5 | −2.4927 | 1.082 | 1.92286 | 18.89 |
| 6 | −1.0344 | 0.300 | 1.88300 | 40.76 |
| 7 | 1.5386 | 0.243 | | |
| 8 | 3.0477 | 3.228 | 1.88300 | 40.76 |
| 9 | −3.0477 | 0.360 | | |
| 10 (Stop) | ∞ | 0.000 | | |
| 11 | ∞ | 0.000 | | |
| 12 | ∞ | 2.590 | | |
| Image plane | ∞ | | | |

Various data

| | |
|---|---|
| f | 0.248 |
| Fno | 5.092 |
| ω | 150° |
| φ | 0.5 |
| fi | 2.59 |

Surface no. 11 denotes an ideal lens.
Example 3
Unit mm

Surface data

| Surface no. | r | d | nd | vd |
|---|---|---|---|---|
| Object plane | 14.000 | 14.000 | | |
| 1 | 7.6368 | 0.298 | 2.0033 | 28.27 |
| 2 | 3.8523 | 3.486 | | |
| 3 | 5.1401 | 0.300 | 2.0033 | 28.27 |
| 4 | 1.4488 | 2.167 | | |
| 5 | −5.7742 | 1.554 | 2.0033 | 28.27 |
| 6 | −1.5100 | 0.300 | 1.8830 | 40.76 |
| 7 | 3.3102 | 3.817 | | |
| 8 | 3.4102 | 1.122 | 1.5927 | 35.31 |
| 9 | ∞ | 0.360 | | |
| 10 (stop) | ∞ | 0.000 | | |
| 11 | ∞ | 0.000 | | |
| 12 | ∞ | 2.590 | | |
| Image plane | ∞ | | | |

Various data

| | |
|---|---|
| f | 0.180 |
| Fno | 5.163 |
| ω | 175° |

-continued

| Surface no. | r | d | nd | vd |
|---|---|---|---|---|
| φ | | 0.5 | | |
| fi | | 2.59 | | |

Surface no. 11 denotes an ideal lens.

Example 4
unit mm

| Surface no. | r | d | nd | vd |
|---|---|---|---|---|
| Object plane | 20.000 | 20.000 | | |
| 1 | 11.3729 | 0.351 | 1.88300 | 40.76 |
| 2 | 7.1077 | 2.805 | | |
| 3 | 6.4585 | 0.283 | 1.88300 | 40.76 |
| 4 | 3.5804 | 2.311 | | |
| 5 | 5.3734 | 0.300 | 1.88300 | 40.76 |
| 6 | 1.5445 | 1.800 | | |
| 7 | −25.0294 | 1.312 | 1.90781 | 19.55 |
| 8 | −1.3892 | 0.300 | 2.00480 | 27.95 |
| 9 | 1.3892 | 1.305 | | |
| 10 | 2.0155 | 1.071 | 1.93376 | 33.84 |
| 11 | −20.1876 | 0.341 | | |
| 12 ( Stop) | ∞ | 0.105 | | |
| 13 | 1.3475 | 1.208 | 1.77210 | 45.23 |
| 14 | −0.5061 | 0.643 | 1.95906 | 17.47 |
| 15 | −1.7832 | 0.393 | | |
| 16 | ∞ | 0.300 | 1.51633 | 64.14 |
| 17 | ∞ | 0.030 | | |
| Image plane | ∞ | | | |

Various data

| | |
|---|---|
| f | 0.188 |
| Fno | 3.059 |
| ω | 179° |

Example 5
Unit mm

| Surface no. | r | d | nd | vd |
|---|---|---|---|---|
| Object plane | ∞ | ∞ | | |
| 1 | 8.0000 | 0.500 | 1.88300 | 40.76 |
| 2 | 3.6000 | 2.800 | | |
| 3 | 3.9000 | 0.500 | 1.88300 | 40.79 |
| 4 | 1.6000 | 1.030 | | |
| 5 | 4.4368 | 0.1299 | 1.7300 | 53.93 |
| 6 | 0.7709 | 0.5688 | | |
| 7 | 1.3528 | 0.0938 | 1.61800 | 63.38 |
| 8 | 0.7734 | 0.3313 | | |
| 9 | 1.3673 | 0.3588 | 1.59551 | 39.23 |
| 10 | −0.7178 | 0.0625 | 1.62280 | 56.98 |
| 11 | 8.6559 | 0.2375 | 1.8050 | 40.97 |
| 12 | 14.0377 | 0.0806 | | |
| 13 | ∞ | 0.0938 | 1.58100 | 41.00 |
| 14 | ∞ | 0.0940 | | |
| 15 (Stop) | ∞ | 0.0935 | | |
| 16 | −2.8380 | 0.0500 | 1.59551 | 39.23 |
| 17 | 1.9923 | 0.2188 | 1.65160 | 58.60 |
| 18 | −1.0701 | 0.0063 | | |
| 19 | 3.5704 | 0.2188 | 1.48749 | 70.15 |
| 20 | −0.8001 | 0.0625 | 1.80518 | 25.43 |
| 21 | −1.6272 | 2.7000 | | |
| Image plane | ∞ | | | |

-continued

| Surface no. | r | d | nd | vd |
|---|---|---|---|---|

Various data

| | |
|---|---|
| f | 0.481 |
| Fno | 6.635 |
| ω | 179° |

Example 6
Unit mm

| Surface no. | r | d | nd | vd |
|---|---|---|---|---|
| Object plane | 10.000 | 10.000 | | |
| 1 | 3.6177 | 0.3178 | 1.88300 | 40.76 |
| 2 | 1.2519 | 1.4609 | | |
| 3 | 2.5508 | 0.3000 | 1.88300 | 40.76 |
| 4 | 0.4221 | 0.5316 | | |
| 5 | 1.3688 | 0.5315 | 1.95906 | 17.47 |
| 6 | 0.5000 | 1.1725 | 1.74000 | 44.78 |
| 7 | −1.1081 | 0.1000 | | |
| 8 | 1.8965 | 4.1389 | 1.88300 | 40.76 |
| 9 | −3.0032 | 0.7802 | | |
| 10 | 5.3324 | 5.0909 | 1.84666 | 23.77 |
| 11 | −4.2104 | 0.2375 | | |
| 12 (Stop) | ∞ | 0.000 | | |
| 13 | ∞ | 0.000 | | |
| 14 | ∞ | 3.480 | | |
| Image plane | ∞ | | | |

Various data

| | |
|---|---|
| f | −0.347 |
| Fno | −3.459 |
| ω | 150° |
| φ | 1.0 |
| fi | 3.48 |

Surface no. 13 denotes an ideal lens.

Example 7
Unit mm

| Surface no. | r | d | nd | vd |
|---|---|---|---|---|
| Object plane | 10.000 | 10.000 | | |
| 1 | 3.5957 | 0.3178 | 1.88300 | 40.76 |
| 2 | 1.3657 | 1.4211 | | |
| 3 | 2.4164 | 0.3000 | 1.88300 | 40.76 |
| 4 | 0.4480 | 0.6387 | | |
| 5 | 12.8511 | 1.2996 | 1.92286 | 18.89 |
| 6 | −1.0317 | 0.1000 | | |
| 7 | 1.9372 | 1.2713 | 1.88300 | 40.76 |
| 8 | −0.7000 | 2.2290 | 1.95906 | 17.47 |
| 9 | −1.6271 | 0.1000 | | |
| 10 | 20.0936 | 4.7346 | 1.95906 | 17.47 |
| 11 | 1.5647 | 1.1816 | 1.75520 | 27.51 |
| 12 | −2.3358 | 0.2000 | | |
| 13 (Stop) | ∞ | 0.0000 | | |
| 14 | ∞ | 0.0000 | | |
| 15 | ∞ | 3.4800 | | |
| Image plane | ∞ | | | |

-continued

Surface data

| Surface no. | r | d | nd | νd |
|---|---|---|---|---|

Various data

| | |
|---|---|
| f | −0.333 |
| Fno | −3.474 |
| ω | 150° |
| φ | 1.0 |
| fi | 3.48 |

Surface no. 14 denotes an ideal lens.

Next, values of conditional expressions in each example are given below.

| | Example 1 | Example 2 | Example 3 | Example 4 |
|---|---|---|---|---|
| (1) (RL1o/ndL1)/dL1oi | 0.946 | 1.177 | 1.089 | 1.543 |
| (2) (RL2o/ndL2)/dL2oi | 0.655 | 0.774 | 0.753 | 1.322 |
| (3) RL1o/RL1i | 2.815 | 2.103 | 1.982 | 1.600 |
| (4) (DL1 + DL12)/RL1o | 0.406 | 0.405 | 0.496 | 0.280 |
| (5) dLoi/RL1i | 1.580 | 0.949 | 0.905 | 0.551 |
| (6) dL1iL2o/RL2o | 0.979 | 0.829 | 0.929 | 0.338 |
| (7) dL2oi/RL2i | 5.794 | 2.963 | 2.341 | 0.725 |
| (8) nd1 | 1.883 | 1.883 | 2.012 | 1.883 |
| (9) nd2 | 1.883 | 1.883 | 2.012 | 1.883 |

| | Example 5 | Example 6 | Example 7 |
|---|---|---|---|
| (1) (RL1o/ndL1)/dL1oi | 1.089 | 0.938 | 0.999 |
| (2) (RL2o/ndL2)/dL2oi | 0.531 | 0.661 | 0.671 |
| (3) RL1o/RL1i | 2.222 | 2.890 | 2.633 |
| (4) (DL1 + DL12)/RL1o | 0.413 | 0.492 | 0.484 |
| (5) dLoi/RL1i | 1.083 | 1.636 | 1.400 |
| (6) dL1iL2o/RL2o | 0.795 | 1.082 | 1.023 |
| (7) dL2oi/RL2i | 1.125 | 4.332 | 3.724 |
| (8) nd1 | 1.883 | 1.883 | 1.883 |
| (9) nd2 | 1.883 | 1.883 | 1.883 |

It is possible to use the wide-angle optical system of the present embodiment for an optical system of an image pickup apparatus and an optical system of a projection apparatus.

Figure 21A:
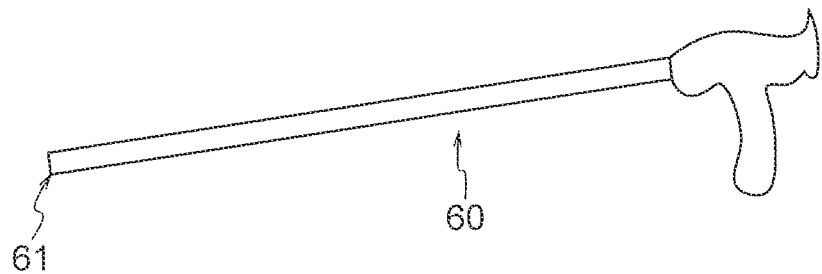
FIG. 21A and FIG. 21B are diagrams showing examples of an image pickup apparatus.
Figure 21B:
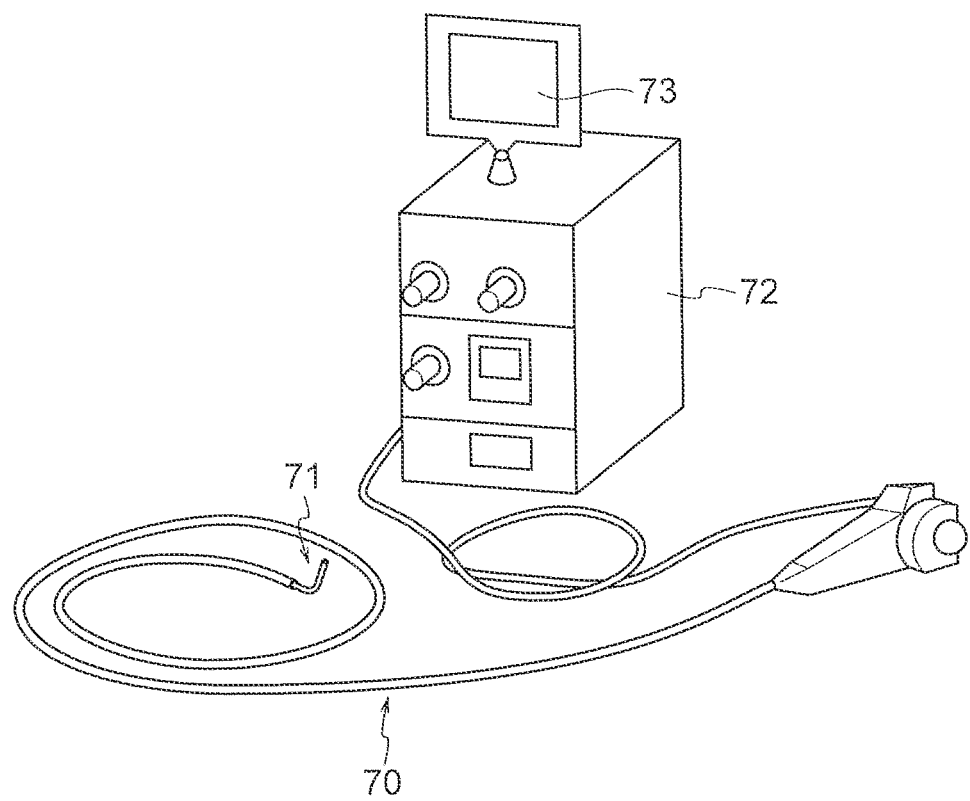

FIG. 21A and FIG. 21B are diagrams showing examples of an image pickup apparatus. The image pickup apparatus is an endoscope. FIG. 21A is a diagram showing a rigid endoscope, and FIG. 21B is a diagram showing a flexible endoscope.

As shown in FIG. 21A, an optical unit 61 is disposed at a front end of an insertion portion of an endoscope 60. It is possible to use the wide-angle optical system of the present embodiment for the optical unit 61. Accordingly, it is possible to acquire a front-view image, an image in a side-view direction, and a rear-view image in all orientations. Consequently, it is possible to observe various parts from angles different from those in conventional endoscopes.

Moreover, as shown in FIG. 21B, an optical unit 71 is disposed at a front end of an insertion portion of an endoscope 70. It is possible to use the wide-angle optical system of the present embodiment for the optical unit 71. Accordingly, it is possible to acquire a front-view image, an image in a side-view direction, and a rear-view image in all orientations. Consequently, it is possible to observe various parts from angles different from those in the conventional endoscopes.

It is possible to display acquired images on a display unit 73 via an image processor 72. In the image processor 72, it is possible to execute various image processing.

Figure 22:
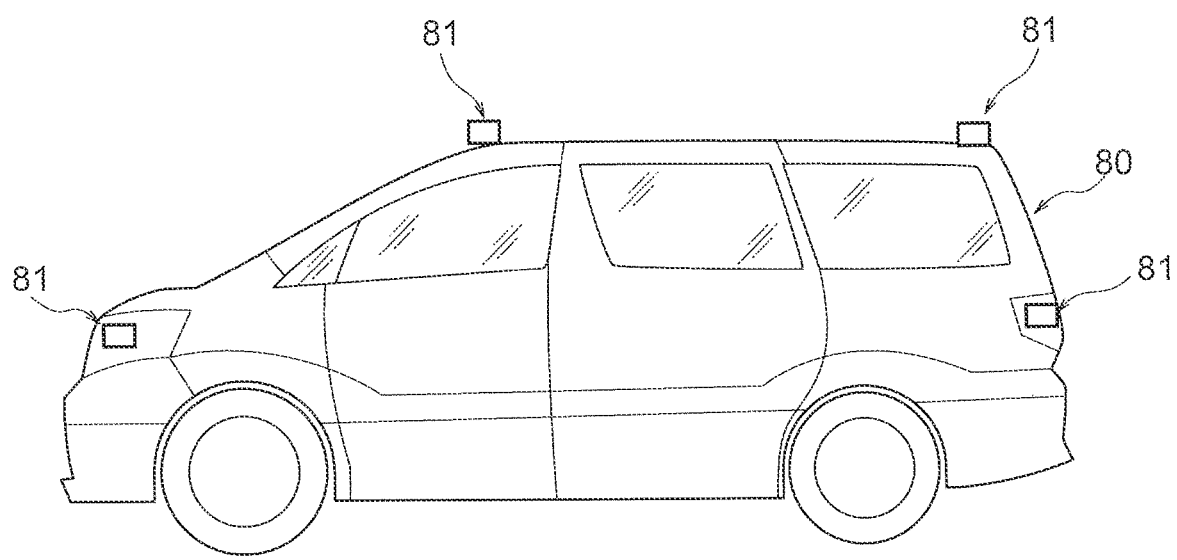
FIG. 22 is a diagram showing another example of an image pickup apparatus.

FIG. 22 is a diagram showing another example of an image pickup apparatus. The image pickup apparatus is a car-mounted camera.

In FIG. 22, a plurality of car-mounted cameras is installed at all corners and on a top of an automobile. A photographing optical system 81 is disposed in the car-mounted cameras. It is possible to use the wide-angle optical system of the present embodiment for the photographing optical system 81.

An optical image formed by the photographing optical system is captured by an image sensor. By capturing the optical image, it is possible to acquire an image of an object. The acquired image is displayed on a display unit in the car. Moreover, a distortion may be corrected by executing image processing on the image.

Figure 23:
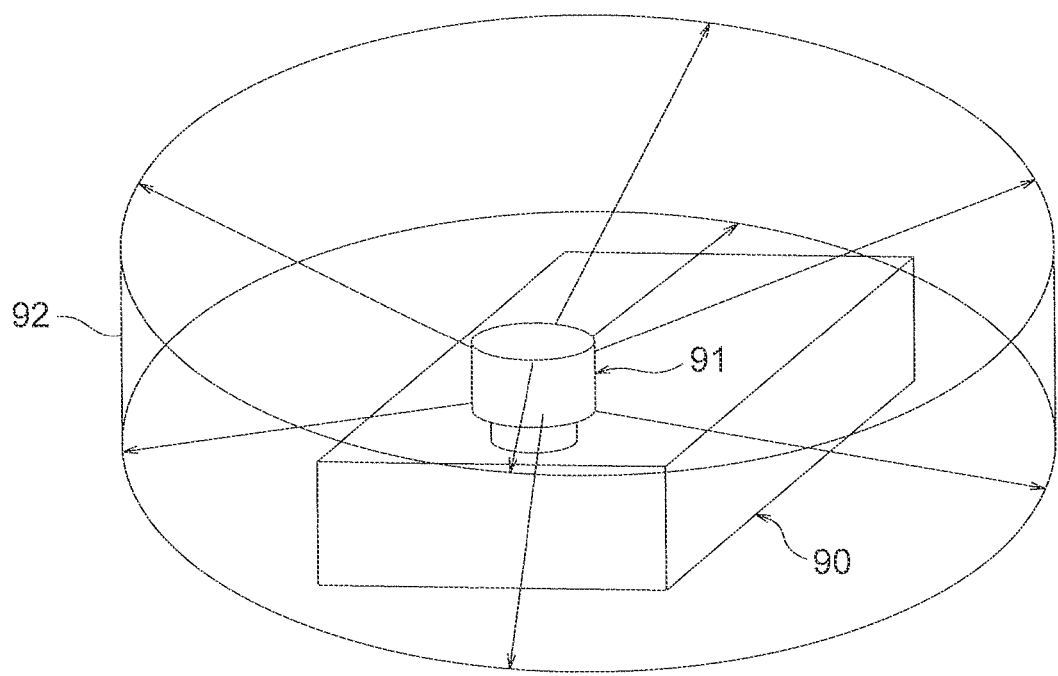
FIG. 23 is a diagram showing an example of a projection apparatus.

FIG. 23 is a diagram showing an example of a projection apparatus. A projection optical system 91 is disposed in a projection apparatus 90. It is possible to use the wide-angle optical system of the present embodiment for the projection optical system 91.

In a case of using the wide-angle optical system of the present embodiment for the image pickup apparatus, an image sensor is disposed on an image plane of the wide-angle optical system. In a case of using the wide-angle optical system of the present embodiment for the projection apparatus, a display element is disposed at a position of the image sensor.

By displaying an image on the display element, an image is projected on a screen 92. In the wide-angle optical system of the present embodiment, the angle of view is extremely wide. Accordingly, it is possible to project an image on a front, on a side, and on a rear. Accordingly, even when the screen 92 is provided to encircle the projection optical system 91, it is possible to project an image on the entire surface of the screen 92.

A dome may have been disposed at an upper portion of the projection optical system 91. Even in this case, it is possible to project an image not only on the screen 92 but also on the dome.

Figure 24:
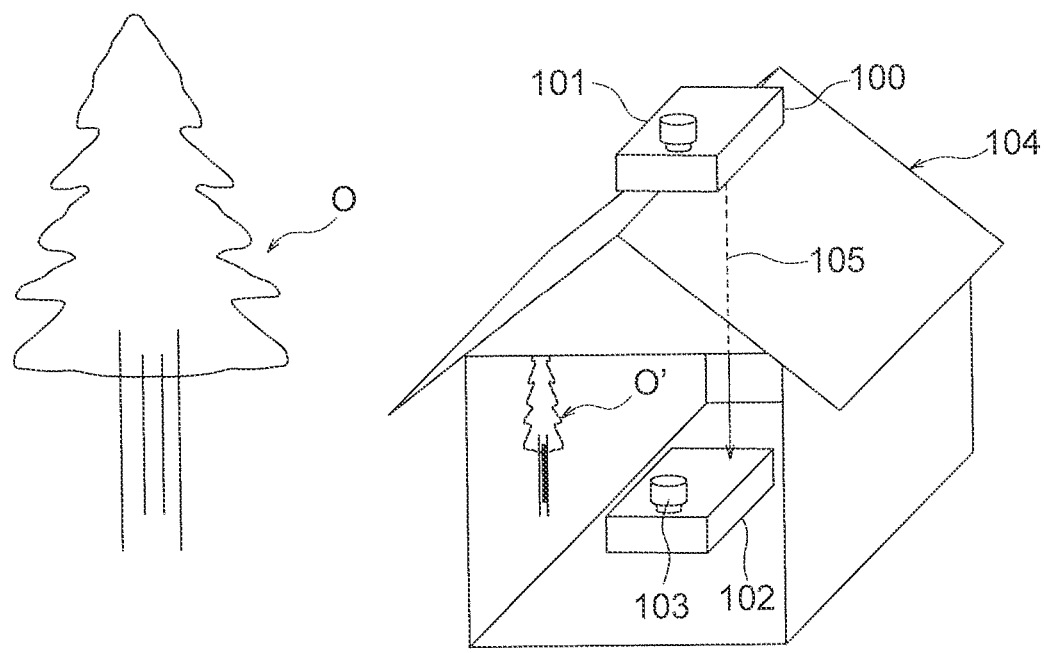
FIG. 24 is a diagram showing an example in which an image pickup apparatus and a projection apparatus are combined.

FIG. 24 is a diagram showing an example in which an image pickup apparatus and a projection apparatus are combined. A photographing optical system 101 is disposed in an image pickup apparatus 100. A projection optical system 103 is disposed in a projection apparatus 102. It is possible to use the wide-angle optical system of the present embodiment for the photographing optical system 101 and the projection optical system 103.

The image pickup apparatus 100 is installed at an exterior of a building 104, for example, on a roof. The image pickup apparatus 101 and the projection apparatus 102 are connected by a communication wire 105.

In the image pickup apparatus 100, an image of an outdoor scenery is captured by the photographing optical system 101. The image of the outdoor scenery is transmitted to the projection apparatus 102. The image of the outdoor scenery may be transmitted to the projection apparatus 102 by wireless transmission.

The image of the outdoor scenery is projected on an indoor wall surface by the projection optical system 103, for example. By making such arrangement, it is possible to view the outdoor scenery indoors.

The image pickup apparatus 100 may be mounted on a flying object such as drone. By making such arrangement, it is possible to capture the outdoor scenery from even higher position.

Appended Modes (Appended Mode 1)

A set of negative meniscus lenses, wherein following conditional expressions (1') and (2') are satisfied:

$$0.9 < (RL1o/ndL1)/dL1oi < 1.2 \quad (1')$$

$$0.4 < (RL2o/ndL2)/dL2oi < 0.8 \quad (2')$$

where, $RL1o$ denotes the radius of curvature of an object-side surface of a first meniscus lens, $RL2o$ denotes the radius of curvature of an object-side surface of a second meniscus lens, $ndL1$ denotes the refractive index for a d-line of the first meniscus lens, $ndL2$ denotes the refractive index for a d-line of the second meniscus lens, $dL1oi$ denotes the distance between a center of curvature of the object-side surface of the first meniscus lens and a center of curvature of an image-side surface of the first meniscus lens, and $dL2oi$ denotes the distance between a center of curvature of the object-side surface of the second meniscus lens and a center of curvature of an image-side surface of the second meniscus lens.

(Appended Mode 2)

A set of negative meniscus lenses, wherein following conditional expressions (3') and (4') are satisfied:

$$1.9 < RL1o/RL1i < 3.0 \quad (3')$$

$$0.4 < (DL1 + DL12)/RL1o < 0.6 \quad (4')$$

where, $RL1o$ denotes the radius of curvature an object-side surface of a first meniscus lens, $RL1i$ denotes the radius of curvature of an image-side surface of the first meniscus lens, $DL1$ denotes the distance on an optical axis between the object-side surface of the first meniscus lens and an image-side surface of the first meniscus lens, and $DL12$ denotes the distance on the optical axis between the image-side surface of the first meniscus lens and an object-side surface of a second meniscus lens.

(Appended Mode 3)

A set of negative meniscus lenses, wherein following conditional expressions (5'), (6'), and (7') are satisfied:

$$0.9 < dL1oi/RL1i < 1.7 \quad (5')$$

$$0.7 < dL1iL2o/RL2o < 1.1 \quad (6')$$

$$1.0 < dL2oi/RL2i < 6.0 \quad (7')$$

where, $RL1i$ denotes the radius of curvature of an image-side surface of a first meniscus lens, $RL2o$ denotes the radius of curvature of an object-side surface of a second meniscus lens, $RL2i$ denotes the radius of curvature of an image-side surface of the second meniscus lens, $dL1oi$ denotes the distance between the center of curvature of an object-side surface of the first meniscus lens and the center of curvature of the image side surface of the first meniscus lens, $dL1iL2o$ denotes the distance between the center of curvature of the image side surface of the first meniscus lens and the center of curvature of the object-side surface of the second meniscus lens, and $dL2oi$ denotes the distance between the center of curvature of the object-side surface of the second meniscus lens and the center of curvature of the image-side surface of the second meniscus lens.

(Appended Mode 4)

A set of negative meniscus lenses, wherein following conditional expressions (8) and (9) are satisfied:

$$1.8 < ndL1 \quad (8)$$

$$1.8 < ndL2 \quad (9)$$

where, $ndL1$ denotes the refractive index for a d-line of a first meniscus lens, and $ndL2$ denotes the refractive index for a d-line of a second meniscus lens.

(Appended Mode 5)

A set of negative meniscus lenses, wherein following conditional expressions (8') and (9') are satisfied:

$$1.9 < ndL1 \quad (8')$$

$$1.9 < ndL2 \quad (9')$$

where, $ndL1$ denotes the refractive index for a d-line of a first meniscus lens, and $ndL2$ denotes the refractive index for a d-line of a second meniscus lens.

According to the present disclosure, it is possible to provide a set of negative meniscus lenses which is used in an optical system having an angle of view not smaller than 240°, in which various aberrations are corrected favorably. Moreover, according to the present disclosure, it is possible to provide a wide-angle optical system, an image pickup apparatus, and a projection apparatus which includes the abovementioned set of negative meniscus lenses.

As described heretofore, the present disclosure is suitable for a set of negative meniscus lenses which is used in an optical system having an angle of view not smaller than 240°, in which various aberrations are corrected favorably. Moreover, the present disclosure is suitable for a wide-angle optical system having an angle of view not smaller than 240°, in which various aberrations are corrected favorably. Furthermore, the present disclosure is suitable for an image pickup apparatus which is capable of imaging clearly a range corresponding to the angle of view not smaller than 240°. Also, the present disclosure is suitable for a projection apparatus which is capable of projecting a sharp image in the range corresponding to the angle of view not smaller than 240°.

What is claimed is:

1. A set of negative meniscus lenses, comprising:
a first meniscus lens; and
a second meniscus lens,
wherein:
the set of negative meniscus lenses has a predetermined lens surface,
the set of negative meniscus lenses is used for an optical system having an angle of view not smaller than 240°,
one negative meniscus lens in the set of negative meniscus lenses is located nearest to an object,
the predetermined lens surface is a hemispherical surface or a surface extending beyond hemisphere,
the first meniscus lens and the second meniscus lens are adjacent, both the first meniscus lens and the second meniscus lens are meniscus lenses having a convex surface directed toward an object side, and the following conditional expressions (1) and (2) are satisfied:

$$0.9 < (RL1o/ndL1)/dL1oi < 1.6 \quad (1)$$

$$0.4 < (RL2o/ndL2)/dL2oi < 1.4 \quad (2)$$

where,

RL1o denotes a radius of curvature of an object-side surface of the first meniscus lens, RL2o denotes a radius of curvature of an object-side surface of the second meniscus lens, ndL1 denotes a refractive index for a d-line of the first meniscus lens, ndL2 denotes a refractive index for a d-line of the second meniscus lens, dL1oi denotes a distance between a center of curvature of the object-side surface of the first meniscus lens and a center of curvature of an image-side surface of the first meniscus lens, and dL2oi denotes a distance between a center of curvature of the object-side surface of the second meniscus lens and a center of curvature of an image-side surface of the second meniscus lens.

2. The set of negative meniscus lenses according to claim 1, wherein the following conditional expressions (3) and (4) are satisfied:

$$1.5 < RL1o/RL1i < 3.0 \quad (3)$$

$$0.2 < (DL1+DL12)/RL1o < 0.7 \quad (4)$$

where,

RL1i denotes a radius of curvature of an image-side surface of the first meniscus lens, DL1 denotes a distance on an optical axis between the object-side surface of the first meniscus lens and the image-side surface of the first meniscus lens, and DL12 denotes a distance on the optical axis between the image-side surface of the first meniscus lens and an object-side surface of the second meniscus lens.

3. The set of negative meniscus lenses according to claim 1, wherein the predetermined lens surface is a surface which is convex on the object side.

4. A wide-angle optical system having an angle of view not smaller than 240°, comprising:

the set of negative meniscus lenses according to claim 1; and a lens which is disposed on an image side of the set of negative meniscus lenses.

5. An image pickup apparatus comprising:

the wide-angle optical system according to claim 4; and an image sensor which is disposed on an image side of the wide-angle optical system, wherein the image sensor has an image pickup surface, and converts an image formed on the image pickup surface by the wide-angle optical system to an electric signal.

6. A projection apparatus comprising:

the wide-angle optical system according to claim 4, and a display element which is disposed on an image side of the wide-angle optical system, wherein:

the display element has a display surface, and an image displayed on the display surface is projected on an object side by the wide-angle optical system.

7. A set of negative meniscus lenses, comprising:

a first meniscus lens, and a second meniscus lens, wherein:

the set of negative meniscus lenses has a predetermined lens surface, the set of negative meniscus lenses is used for an optical system having an angle of view not smaller than 240°, one negative meniscus lens in the set of negative meniscus lenses is located nearest to an object, the predetermined lens surface is a hemispherical surface or a surface extending beyond hemisphere, the first meniscus lens and the second meniscus lens are adjacent, both the first meniscus lens and the second meniscus lens are meniscus lenses having a convex surface directed toward an object side, and the following conditional expressions (5), (6), and (7) are satisfied:

$$0.5 < dL1oi/RL1i < 1.7 \quad (5)$$

$$0.3 < dL1iL2o/RL2o < 1.1 \quad (6)$$

$$0.7 < dL2oi/RL2i < 6.0 \quad (7)$$

where,

RL1i denotes a radius of curvature of an image-side surface of the first meniscus lens, RL2o denotes a radius of curvature of an object-side surface of the second meniscus lens, RL2i denotes a radius of curvature of an image-side surface of the second meniscus lens, dL1oi denotes a distance between a center of curvature of an object-side surface of the first meniscus lens and a center of curvature of the image side surface of the first meniscus lens, dL1iL2o denotes a distance between a center of curvature of the image side surface of the first meniscus lens and a center of curvature of the object-side surface of the second meniscus lens, and dL2oi denotes a distance between the center of curvature of the object-side surface of the second meniscus lens and a center of curvature of the image-side surface of the second meniscus lens.

\* \* \* \* \*